United States Patent
Chiba

(10) Patent No.: US 10,696,203 B2
(45) Date of Patent: Jun. 30, 2020

(54) SEAT APPARATUS

(71) Applicant: TS TECH CO., LTD., Asaka-shi, Saitama (JP)

(72) Inventor: Tomohisa Chiba, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 16/403,754

(22) Filed: May 6, 2019

(65) Prior Publication Data
US 2019/0255978 A1 Aug. 22, 2019

Related U.S. Application Data

(63) Continuation of application No. 15/354,272, filed on Nov. 17, 2016, now Pat. No. 10,279,719.

(30) Foreign Application Priority Data

Nov. 19, 2015 (JP) .................................. 2015-226976
Oct. 17, 2016 (JP) .................................. 2016-203700

(51) Int. Cl.
*B60N 2/90* (2018.01)
*B62J 1/12* (2006.01)
(Continued)

(52) U.S. Cl.
CPC ................ *B60N 2/914* (2018.02); *B62J 1/12* (2013.01); *B62J 1/26* (2013.01); *B62J 45/40* (2020.02)

(58) Field of Classification Search
CPC ..... B60N 2/914; B62J 1/12; B62J 1/26; B62J 2099/002

(Continued)

(56) References Cited

U.S. PATENT DOCUMENTS 5,082,326 A * 1/1992 Sekido .................. B60N 2/914
297/284.6
5,320,409 A 6/1994 Katoh et al.
(Continued)

FOREIGN PATENT DOCUMENTS

JP   S41-009551 U   5/1966
JP   S58-007245 A   1/1983
(Continued)

OTHER PUBLICATIONS

Office Action issued in related application JP 2016-203700, dated Mar. 26, 2019, with machine generated English language translation, 8 pages.

*Primary Examiner* — Milton Nelson, Jr.
(74) *Attorney, Agent, or Firm* — Faegre Drinker Biddle & Reath LLP

(57) ABSTRACT

A seat apparatus includes a vehicle seat including a cushion member having a bottom portion with a plurality of recessed portions, a plurality of air cells configured to expand by injection of compressed air, and a fluid supply mechanism configured to supply the fluid to the air cells. In the seat apparatus, at least one of the recessed portions is provided at a portion of the bottom portion of the cushion member positioned at a seating portion of the vehicle seat, the hip of a passenger being placed on the seating portion. Each air cell is expandable in a corresponding one of the recessed portions. The fluid supply mechanism is configured to expand at least one air cell by supplying the compressed air thereto and to change the at least one air cell to be expanded by switching a fluid supply destination.

7 Claims, 16 Drawing Sheets

(51) Int. Cl.
  *B62J 1/26* (2006.01)
  *B62J 45/40* (2020.01)
(58) Field of Classification Search
  USPC .................. 297/452.41, DIG. 3; 5/644, 655.3
  See application file for complete search history.

(56) References Cited

U.S. PATENT DOCUMENTS

| | | | |
|---|---|---|---|
| 5,658,050 A | 8/1997 | Lorbiecki | |
| 9,751,440 B2 * | 9/2017 | Dry ...................... | B60N 2/5642 |
| 9,896,003 B2 * | 2/2018 | Tamura ................. | B60N 2/2222 |
| 2013/0285426 A1 * | 10/2013 | Arant ...................... | B60N 2/62 |
| | | | 297/284.1 |
| 2015/0175229 A1 | 6/2015 | Chiba et al. | |
| 2015/0183476 A1 | 7/2015 | Chiba et al. | |
| 2017/0156519 A1 * | 6/2017 | Cheng ................. | A47G 9/1027 |
| 2018/0037284 A1 | 2/2018 | Chiba et al. | |
| 2018/0086404 A1 | 3/2018 | Chiba et al. | |

FOREIGN PATENT DOCUMENTS

| | | |
|---|---|---|
| JP | 2002-017506 A | 1/2002 |
| JP | 2005-125861 A | 5/2005 |
| JP | 2014-227137 A | 12/2014 |

* cited by examiner

SEAT APPARATUS

CROSS REFERENCE TO RELATED APPLICATIONS

This application is a continuation of U.S. patent application Ser. No. 15/354,272, filed Nov. 17, 2016, now U.S. Pat. No. 10,279,719, which claims the priority benefit of Japanese Patent Application Nos. JP2015-226976, filed Nov. 19, 2015 and JP2016-203700, filed Oct. 17, 2016, the contents of all being incorporated herein by reference.

BACKGROUND

The present disclosure relates to a seat apparatus, and particularly relates to a seat apparatus capable of ensuring both of elasticity and hardness of a vehicle seat.

A vehicle seat is typically configured such that a cushion member is covered with a skin material. Moreover, the cushion member is formed of a relatively-soft material, such as urethane foam, so that a favorable ride quality can be provided to a passenger of a vehicle. Note that a lower hardness of the cushion member results in a greater change in elasticity of the seat over time, and therefore, lowering of such elasticity is easily accelerated.

There is a vehicle seat configured such that an air cushion is provided at a position below a cushion member for the purpose of adjusting hardness of the vehicle seat (see, e.g., Japanese Patent Publication JP 2005-125861). According to the vehicle seat described in JP 2005-125861, compressed air is injected into the air cushion to expand the air cushion, and therefore, hardness of the seat can be set to a proper hardness. Thus, lowering of elasticity of the vehicle seat can be suppressed.

As described above, it has been demanded for a vehicle seat that both of elasticity and hardness are ensured as performance of the vehicle seat. In addition to the above-described demand, it has been demanded that the state of the vehicle seat is smoothly switched, and more specifically, is smoothly switched depending on the situation between the state of stably holding a passenger's posture and the state of not interrupting a posture change.

A flow path for supplying compressed air to a bag body such as the above-described air cushion is sometimes made of a bendable material (hereinafter referred to as a "flow path formation member") such as a film. In such a configuration, when the flow path formation member is involuntarily bent, the flow path is clogged, and as a result, supply of compressed air to the air cushion and discharge of compressed air from the air cushion might not be properly performed.

Moreover, in a configuration in which electric equipment operating to supply compressed air is housed in a seat, a portion of a cushion member of the seat may be recessed such that a housing space is provided, for example. In this configuration, there is a possibility that foreign substances, rainwater, etc. having entered the housing space interfere with operation of the electric equipment.

SUMMARY

The present disclosure has been made in view of the above-described problems, and an embodiment provides a seat apparatus capable of ensuring both of elasticity and hardness (e.g., firmness) of a vehicle seat and properly switching a state of the vehicle seat depending on various situations. Moreover, an embodiment of the present disclosure reduces clogging of a flow path due to bending of a flow path formation member in a configuration in which the flow path formation member is a bendable material. Further, an embodiment of the present disclosure suppresses foreign substances, rainwater, etc. from entering a housing space for electric equipment in a configuration in which a portion of a cushion member of a seat is recessed such that the housing space is provided.

Some of the above-described problems are solved by an embodiment of a seat apparatus of the present disclosure. Such an embodiment of a seat apparatus includes a vehicle seat including a cushion member having a bottom portion with a plurality of recessed portions, a plurality of bag bodies configured to expand by injection of fluid, and a fluid supply mechanism configured to supply the fluid to the bag bodies. Some of the recessed portions are provided in a portion of the bottom portion of the cushion member positioned in a seating portion of the vehicle seat, the seating portion being a portion of the vehicle seat on which a hip of a seated passenger is placed. Each bag body is expandable in a corresponding one of the recessed portions. The fluid supply mechanism is configured to expand at least one bag body of the plurality of the bag bodies by supplying the fluid thereto and to change the at least one bag body to be expanded by switching a fluid supply destination.

In the seat apparatus of the present disclosure configured as described above, the recessed portions are provided at the bottom portion of the cushion member of the vehicle seat. With such recessed portions, the cushion member easily bends along the shape of the hip of the passenger when the passenger is seated on the vehicle seat. Moreover, the bag body configured to expand by injection of the fluid is disposed in each recessed portion. Thus, hardness is ensured by the expanded bag bodies. That is, in an embodiment of the seat apparatus of the present disclosure, both of elasticity and hardness of the vehicle seat are ensured. Of the plurality of bag bodies provided in an embodiment of the seat apparatus of the present disclosure, the bag bodies to be expanded can be changed. With this configuration, the hardness of the vehicle seat can be locally adjusted. That is, in an embodiment of the seat apparatus of the present disclosure, a cushion member portion whose hardness is increased can be changed depending on the situation. As a result, in an embodiment of the seat apparatus of the present disclosure, the state of the vehicle seat can be properly switched depending on the situation.

Moreover, in an embodiment of the above-described seat apparatus, the recessed portions formed at the portion of the bottom portion of the cushion member positioned at the seating portion are provided such that a distance between adjacent ones of the plurality of the recessed portions is uniform. In the above-described configuration, the recessed portions are equally provided at the bottom portion of the cushion member. In such a configuration, the flexibility of the cushion member can be further improved.

Further, in an embodiment of the above-described seat apparatus, each of the plurality of bag bodies includes two or more expandable portions arranged with a dividing portion being interposed therebetween, the bag bodies are arranged such that a distance between adjacent ones of the bag bodies is uniform, and internal spaces of the two or more expandable portions of the each of the plurality of the bag bodies communicate with each other. In the above-described configuration, the bag bodies communicate with each other, and each bag body has such a structure where two or more expandable portions are arranged with the dividing portion being interposed therebetween. With such a structure, two or more expandable portions expand along the arrangement direction thereof, and therefore, the expansion direction of each bag body is suitably controllable. Moreover, the bag bodies are equally arranged, and therefore, the hardness of the vehicle seat is adjustable with a favorable balance in partial hardness adjustment.

In addition, in an embodiment of the above-described seat apparatus, each bag body may be an air cell, and the air cell may be configured to expand along the thickness direction of the vehicle seat by injection of compressed air as the fluid and to contract in the thickness direction by discharging of the injected compressed air. In the above-described configuration, the air cell is used as the bag body. The air cell is configured to expand/contract in the thickness direction of the vehicle seat. With such a configuration, the hardness of the vehicle seat can be adjusted by a relatively-lightweight simple structure.

Moreover, in an embodiment of the above-described seat apparatus, two or more of the bag bodies are coupled together, and internal spaces of the two or more coupled bag bodies communicate with each other. In the above-described configuration, some of the bag bodies are coupled together. Thus, the coupled bag bodies can be collectively handled, and, e.g., the process for attaching the bag bodies is further facilitated.

Further, in an embodiment of the above-described seat apparatus, the fluid supply mechanism may include a switching device operating to switch the fluid supply destination, a sensor configured to output a signal corresponding to a traveling condition of a vehicle on which the vehicle seat is mounted, and a control device configured to control the switching device according to the signal output from the sensor, and the control device may control the switching device to switch the at least one bag body to be expanded. Of the plurality of bag bodies, the bag bodies to be expanded are, in the above-described configuration, switched according to the traveling condition of the vehicle. With this configuration, a hardness balance at the vehicle seat can be optimized according to the traveling condition of the vehicle.

In addition, in an embodiment of the above-described seat apparatus, the bag bodies include air cells. The fluid supply mechanism includes a compressed air generation device configured to generate compressed air as the fluid, a supply path formation member forming a supply path of the compressed air, and the switching device connected to the supply path formation member and operating to switch the compressed air supply destination. The air cells, the compressed air generation device, and the switching device may be attached to the bottom portion of the cushion member. In the above-described configuration, the air cells as the bag bodies and the components of the fluid supply mechanism are attached to the cushion member to form a unit. With this configuration, the air cells and each component of the fluid supply mechanism can be more easily handled.

Moreover, in an embodiment of the above-described seat apparatus, the compressed air generation device and the switching device are attached to a portion of the bottom portion of the cushion member at a position different from the seating portion. In the above-described configuration, the compressed air generation device and the switching device are arranged at the portion of the vehicle seat at the position different from the seating portion, and therefore, influence of these devices on a ride quality can be reduced.

Further, an embodiment of the above-described seating device includes a flow path formation member including a flow path formed for the fluid to extend toward each bag body and made of a bendable material, and a tubular body disposed in the flow path formation member and forming, on an inner side thereof, a portion of the flow path. In an embodiment, the tubular body is made of a material harder than the material of the flow path formation member. In the above-described configuration, the tubular body made of the material harder than that of the flow path formation member is disposed in the flow path formation member made of the bendable material. With this configuration, bending of the flow path formation member can be controlled by the tubular body, and clogging of the flow path due to bending of the flow path formation member can be reduced.

In addition, in an embodiment of the above-described seating device, the flow path is connected to each bag body, and at least a portion of the tubular body is, in the flow path formation member, disposed at a connection portion between the flow path and each bag body. In the above-described configuration, at least the portion of the tubular body is, in the flow path formation member, disposed at the connection portion between the flow path and the bag body. The connection portion between the flow path and the bag body allows for proper expansion and/or contraction of the bag body. Thus, the tubular body disposed at such a portion can be more effectively utilized.

Moreover, in an embodiment of the above-described seating device, a portion of the flow path formation member in which the tubular body is disposed includes a raised portion raised along a surface of the tubular body and positioned to face the cushion member, and a flat portion positioned opposite to the raised portion and extending flat. In the above-described configuration, the portion of the flow path formation member in which the tubular body is disposed has the raised portion and the flat portion, and the flat portion is positioned opposite to the cushion member (in other words, positioned on the same side as a cushion member support member such as a bottom plate). That is, the portion of the flow path formation member in which the tubular body is disposed contacts, at a flat surface, the cushion member support member such as the bottom plate. Thus, the portion of the flow path formation member in which the tubular body is disposed receives a load applied from a cushion member support member side. As a result, damage (or breaking) of the flow path formation member due to the above-described load can be reduced.

Further, in an embodiment of the above-described seating device, the tubular body is made of a resin material identical to that of the flow path formation member, and is welded to the flow path formation member. In addition, in the above-described seating device, each bag body and the flow path formation member may be integrally made of a common material.

Moreover, in an embodiment of the above-described seating device, the fluid supply mechanism includes electric equipment operating to supply the fluid. In an embodiment, the bottom portion of the cushion member is provided with a housing space of the electric equipment, and the housing space is formed by recessing a portion of the bottom portion. In an embodiment, a cover member configured to cover at least a portion of an opening of the housing space is further provided. In the above-described configuration, the recessed housing space configured to house the electric equipment is formed at the bottom portion of the cushion member, and the opening of the housing space is covered with the cover member. Thus, adherence of foreign substances, rainwater, etc. to the electric equipment in the housing space is reduced.

Further, in an embodiment of the above-described seating device, the cushion member may include an inclined portion inclining with respect to the thickness direction of the vehicle seat. The bottom portion at the inclined portion may be provided with a cavity, and the cavity is formed by recessing a portion of the bottom portion. The cavity may be continuous to the housing space. The cover member may cover the opening of the housing space in the state in which at least a portion of an opening of the cavity opens. In the above-described configuration, the housing space of the electric equipment and the cavity formed at the bottom portion of the inclined portion of the cushion member are continuous to each other. Moreover, the cover member covers the opening of the housing space in the state in which at least the portion of the opening of the cavity opens. With these configurations, ventilation to the housing space can be ensured while adherence of foreign substances, rainwater, etc. to the electric equipment can be reduced. Moreover, even if rainwater enters the housing space, such rainwater can be properly discharged through the opening of the cavity.

According to an embodiment of the present disclosure, both of the elasticity and hardness of the vehicle seat can be ensured, and the state of the vehicle seat can be properly switched depending on the situation. Moreover, according to an embodiment of the present disclosure, the recessed portions are equally provided at the bottom portions of the cushion member, and therefore, the flexibility of the cushion member can be further improved. Further, according to an embodiment of the present disclosure, each bag body expands along the arrangement direction of two expandable portions, and therefore, the expansion direction can be properly controlled. In addition, the bag bodies are equally arranged, and therefore, the hardness of the vehicle seat can be adjusted with the favorable balance in partial hardness adjustment. In addition, according to an embodiment of the present disclosure, the air cell is used as the bag body, and therefore, the hardness of the vehicle seat can be adjusted by the relatively-lightweight simple structure. Moreover, according to an embodiment of the present disclosure, some of the bag bodies are coupled together, and therefore, handling of these bag bodies is further facilitated. Further, according to an embodiment of the present disclosure, the bag bodies to be expanded are switched according to the traveling condition of the vehicle, and therefore, the hardness balance (hardness distribution) at the vehicle seat can be optimized according to the traveling condition of the vehicle. In addition, according to an embodiment of the present disclosure, the air cells as the bag bodies and the components of the fluid supply mechanism are attached to the cushion member to form the unit, and therefore, handling of each of the above-described components is further facilitated. Moreover, according to an embodiment of the present disclosure, the compressed air generation device and the switching device are arranged at the position different from the seating portion in the vehicle seat, and therefore, influence of these devices on the ride quality can be reduced. Further, according to an embodiment of the present disclosure, clogging of the flow path due to bending of the flow path formation member can be reduced. In addition, according to an embodiment of the present disclosure, the tubular body is disposed at the significantly important portion in proper expansion/contraction of the bag body, and therefore, the tubular body can be more effectively utilized. Moreover, according to an embodiment of the present disclosure, when the load is applied from, e.g., the bottom plate to the portion of the flow path formation member in which the tubular body is disposed, damage (or breaking) of the flow path formation member due to such a load can be reduced.

Further, according to an embodiment of the present disclosure, adherence of foreign substances, rainwater, etc. to the electric equipment in the housing space formed at the bottom portion of the cushion member can be reduced. In addition, according to an embodiment of the present disclosure, ventilation to the housing space can be ensured while adherence of foreign substances, rainwater, etc. to the electric equipment in the housing space can be reduced. Moreover, even if rainwater enters the housing space, such rainwater can be properly discharged.

BRIEF DESCRIPTION OF THE DRAWINGS

Various embodiments of the invention are illustrated in the drawings, in which.

DETAILED DESCRIPTION

An embodiment of a seat apparatus (the present embodiment) of the present disclosure is described below. Moreover, a seat apparatus mounted on a motorcycle is described below as an example. Note that the seat apparatus of the present disclosure can be mounted on vehicles other than the motorcycle in other embodiments, such as vehicles including, e.g., a motor tricycle and an automobile, or can be mounted on ships and airplanes. The seat apparatus of the present disclosure is particularly effective in a vehicle seat on which a passenger of a vehicle is seated with the passenger straddling the seat, i.e., in a vehicle including a saddle ride type seat.

Note that in the description below, a "front-to-back direction" corresponds to the front-to-back direction of a vehicle seat 1, and is a direction parallel with the traveling direction of the motorcycle. Moreover, a "width direction" corresponds to the width direction (the horizontal width) of the vehicle seat 1, and is a direction parallel with a right-to-left direction when the motorcycle is viewed from a front side. Unless otherwise provided, the position, movement, etc. of various types of equipment described below are those when the motorcycle is in a generally upright state (e.g., a state in which the motorcycle is not horizontally inclined with respect to the ground).

General Configuration of Seat Apparatus

Figure 1:
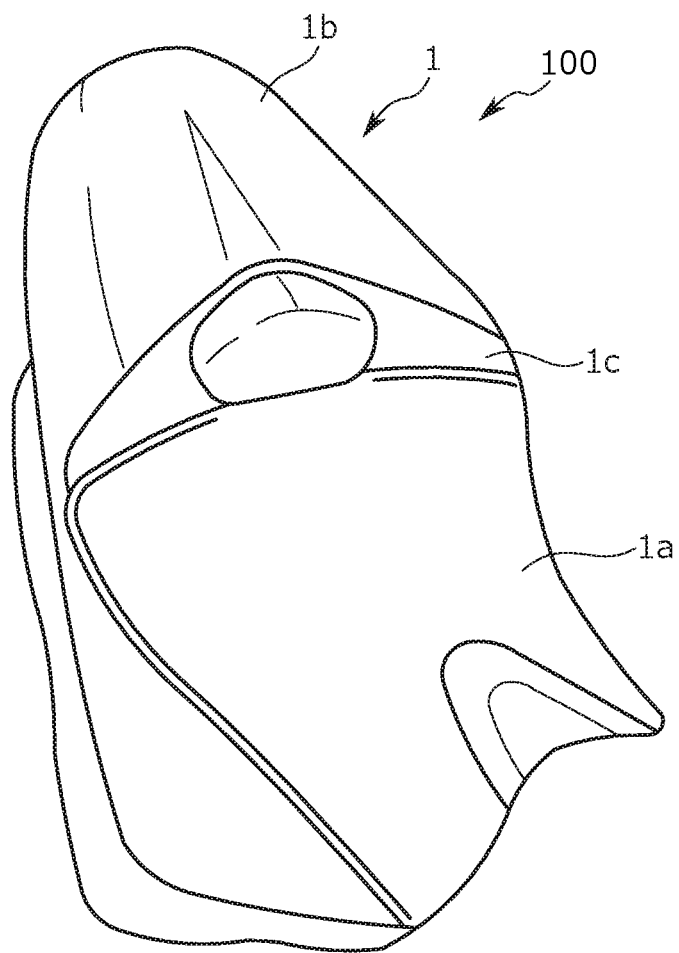
FIG. 1 is a perspective view of an example vehicle seat of an embodiment of the present disclosure.
Figure 2:
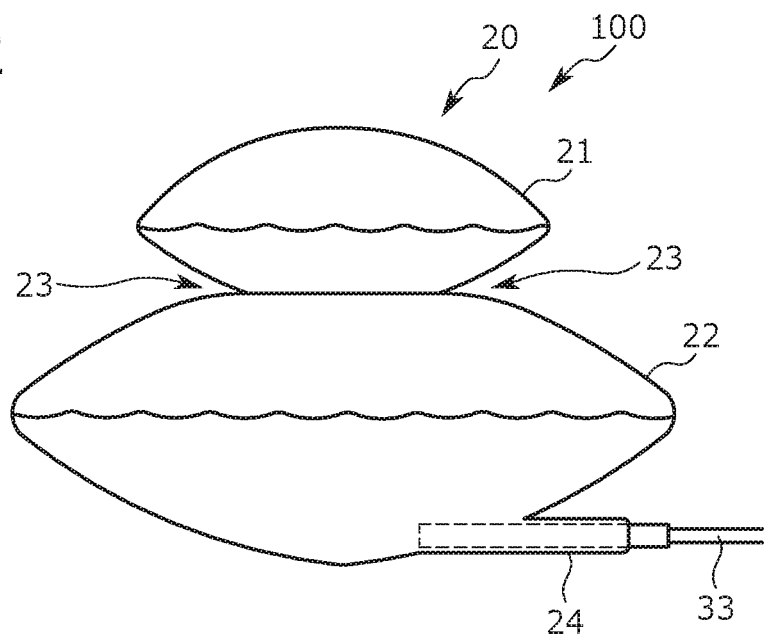
FIG. 2 is a schematic side view of an outer appearance of an example air cell, according to an embodiment.
Figure 3:
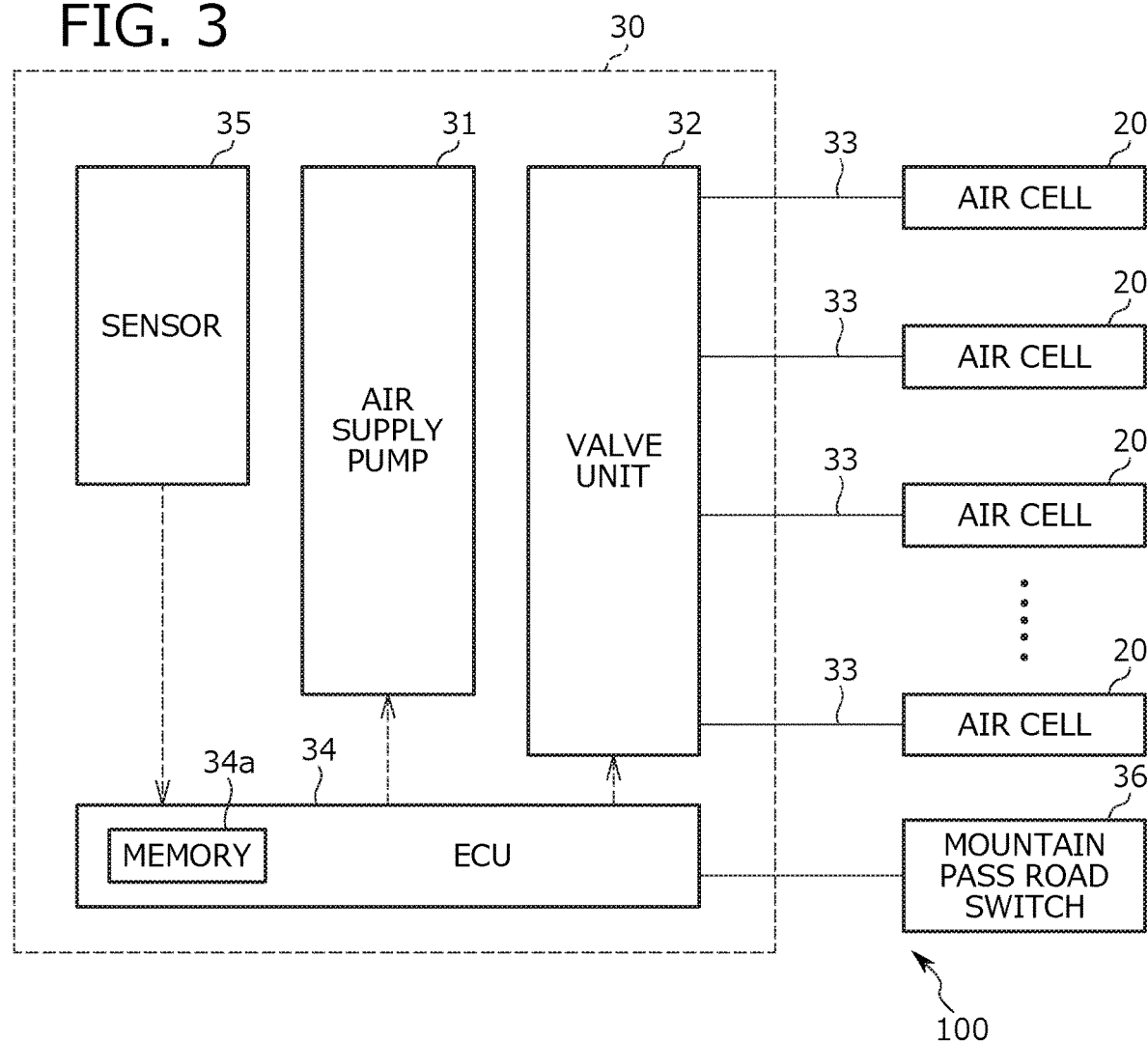
FIG. 3 is a block diagram of an example fluid supply mechanism configuration, according to an embodiment.
Figure 4:
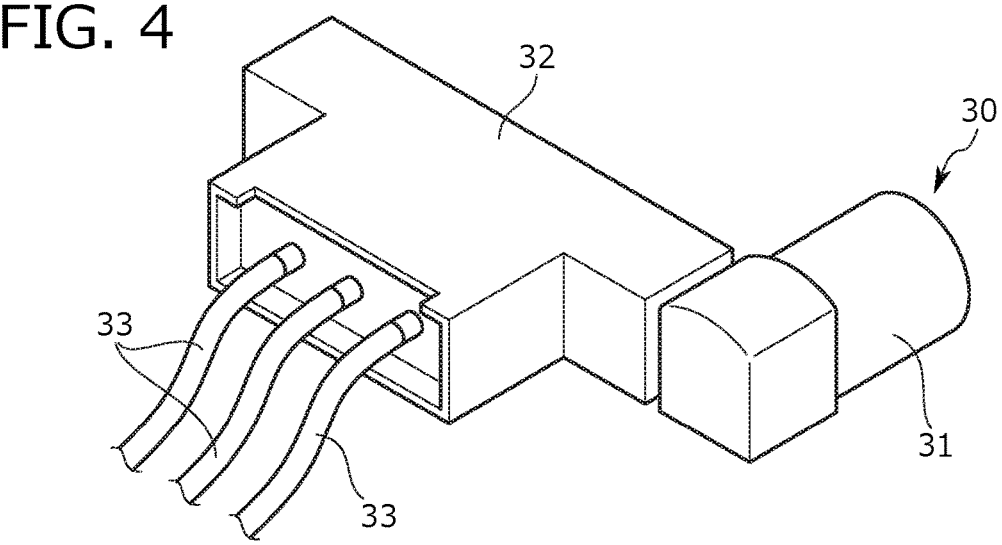
FIG. 4 is a perspective view of a compressed air generation device, a switching device, and a supply path formation member, according to an embodiment.

First, a general configuration of the seat apparatus (hereinafter referred to as a "present device 100") of the present embodiment is described. The present device 100 includes, generally, the vehicle seat 1 illustrated in FIG. 1, air cells 20 illustrated in FIG. 2, and a fluid supply mechanism 30 illustrated in FIGS. 3 and 4. FIG. 1 is a perspective view of the vehicle seat 1 of the present embodiment. FIG. 2 is a schematic side view of an outer appearance of the air cell 20. FIG. 3 is a block diagram of the configuration of the fluid supply mechanism 30. FIG. 4 is a perspective view of an air supply pump 31, a valve unit 32, and tubes 33 as components of the fluid supply mechanism 30.

The passenger of a motorcycle (e.g., the vehicle) is seated on the vehicle seat 1, and the vehicle seat 1 is used in the state in which the vehicle seat 1 is attached to a seat mount portion of a motorcycle body (a vehicle body). Each air cell 20 is a bag body used for adjustment of the hardness (e.g., firmness) of the vehicle seat 1, and is configured to expand by injection of compressed air as a fluid. The fluid supply mechanism 30 is configured to supply the compressed air to the air cells 20.

In the present device 100, the air cells 20 and the fluid supply mechanism 30 are built in the vehicle seat 1, and a mountain pass road switch 36 (described below) is attached to a predetermined portion (e.g., a handle portion) of the vehicle seat 1. Specifically, the air cells 20 and the fluid supply mechanism 30 are attached to a cushion member 2 (the cushion member 2 is described below) in the vehicle seat 1. As described above, in the present embodiment, the vehicle seat 1, the air cells 20, and the fluid supply mechanism 30 are integrated as a unit. Thus, the present device 100 can be handled as a single unit. That is, the present device 100 can be easily attached in such a manner that the vehicle seat 1 including the air cells 20 and the fluid supply mechanism 30 is only attached to the motorcycle body.

Note that the method for attaching each of the air cells 20 and the fluid supply mechanism 30 to the cushion member 2 is not limited, and each of the air cells 20 and the fluid supply mechanism 30 may be attached with an adhesive or with a ready-made fastener, for example.

Components of the Seat Apparatus

A configuration example of each of the vehicle seat 1, the air cells 20, and the fluid supply mechanism 30 as the components of the present device 100 is now described.

Figure 5:
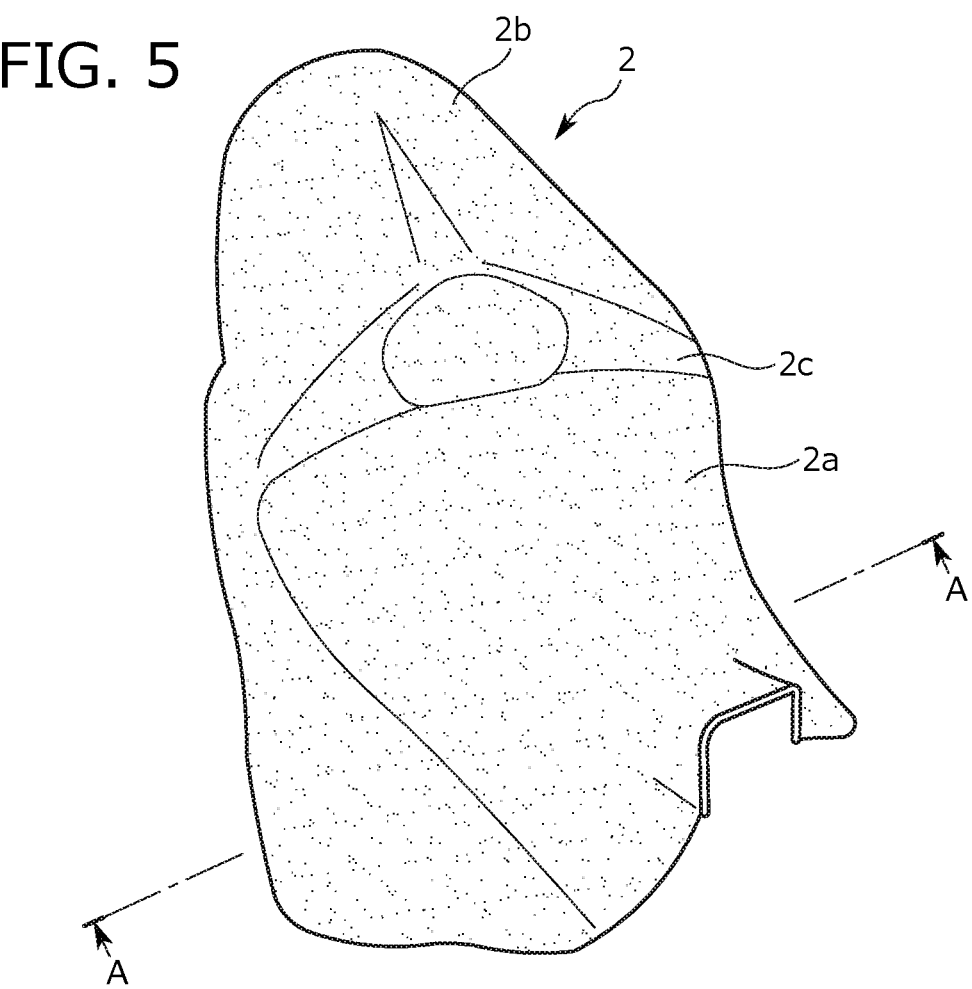
FIG. 5 is a perspective view of a cushion member of the vehicle seat, according to an embodiment.
Figure 6:
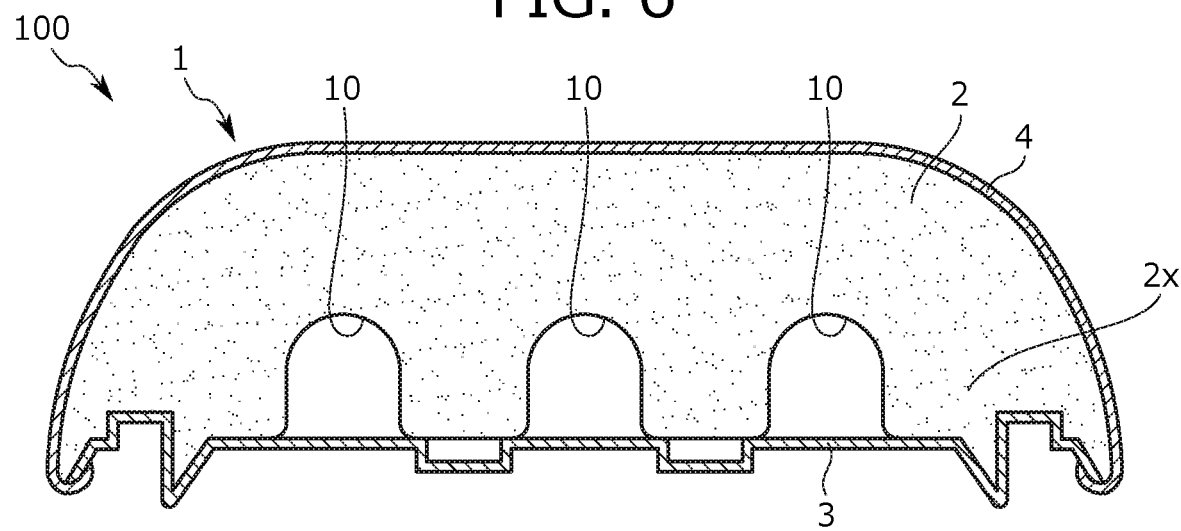
FIG. 6 is a schematic cross-sectional view of the vehicle seat, according to an embodiment.

The vehicle seat 1 is a saddle ride type seat as illustrated in FIG. 1, and a general configuration of the vehicle seat 1 is similar to that of a typical vehicle seat. Specifically, the vehicle seat 1 is configured such that the cushion member 2 illustrated in FIG. 5 is, as illustrated in FIG. 6, covered with a skin material 4 with the cushion member 2 being placed on a bottom plate 3. FIG. 5 is a perspective view of the cushion member 2. FIG. 6 is a schematic cross-sectional view of the vehicle seat 1, and illustrates a cross section along an A-A line of FIG. 5.

The cushion member 2 is a member defining the outer shape of the vehicle seat 1, and is formed of a soft foam material. Urethane foam, polypropylene foam, or polyethylene foam can be utilized as the foam material.

The vehicle seat 1 of the present embodiment is a seat for two persons, the seat including seating portions 1a, 1b at front and back end portions of the seat. The seating portions 1a, 1b are portions of the vehicle seat 1 on which the hips of the passengers are placed. That is, front and back end portions of the cushion member 2 form hip support portions 2a, 2b. The hip support portions 2a, 2b are portions of the cushion member 2 positioned respectively in the seating portions 1a, 1b.

A non-seating portion 1c on which no passenger is seated is provided between the front seating portion 1a and the back seating portion 1b at the vehicle seat 1. That is, a non-supporting portion 2c positioned at the non-seating portion 1c is provided between the front hip support portion 2a and the back hip support portion 2b in the front-to-back direction of the cushion member 2. The non-supporting portion 2c is a portion of the cushion member 2 different from the seating portions 1a, 1b.

Note that the non-seating portion 1c has a step, and the step forms a back rest configured to support the waist of the passenger seated on the front seating portion 1a. Thus, at the cushion member 2, the back hip support portion 2b is provided at a position higher than the front hip support portion 2a by the above-described step.

Figure 7:
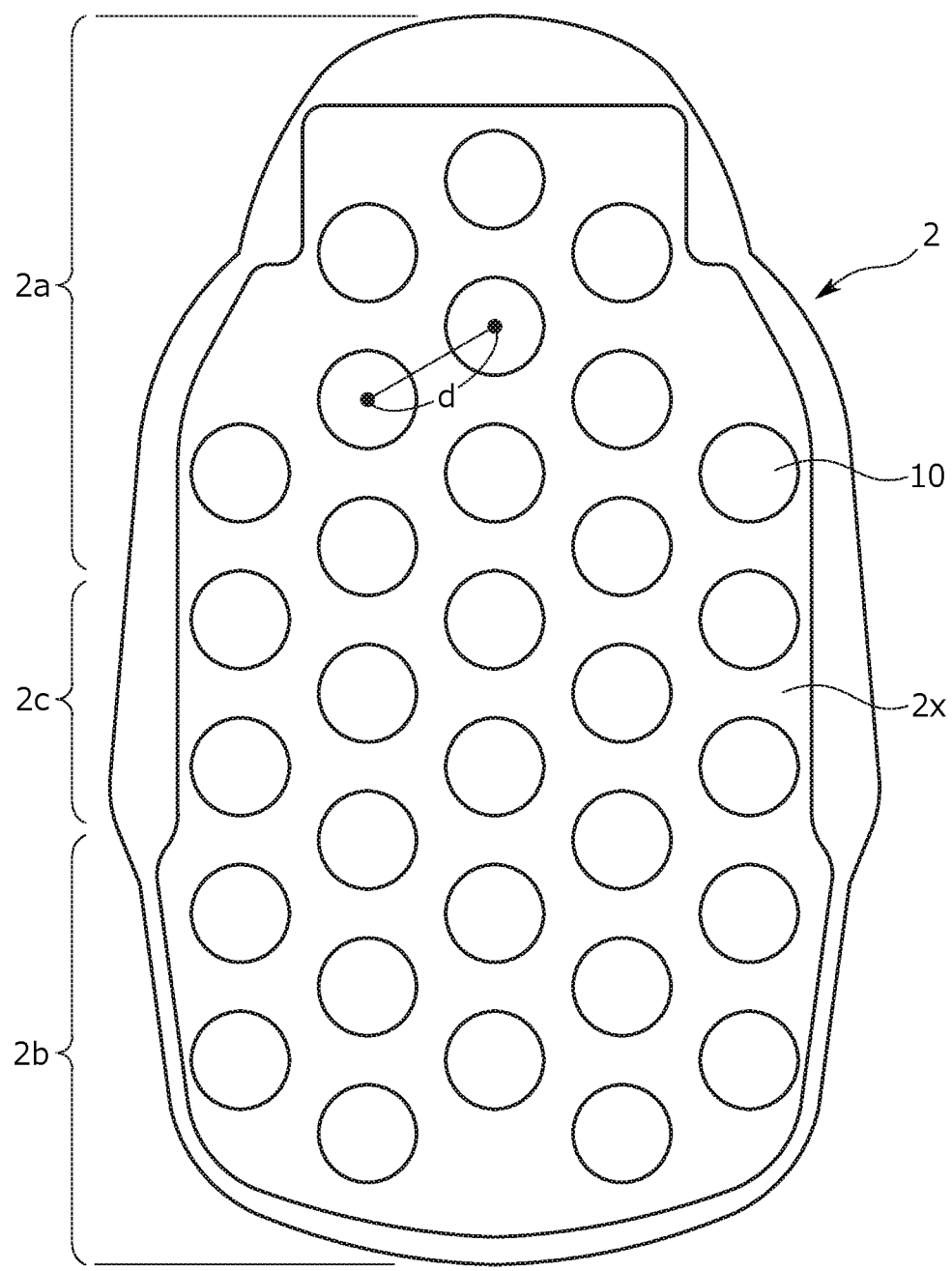
FIG. 7 is a bottom view of a bottom portion of the cushion member, according to an embodiment.

A bottom portion 2x of the cushion member 2 has a plurality of recessed portions 10 as illustrated in FIGS. 6 and 7. FIG. 7 is a bottom view of the bottom portion of the cushion member 2 when the cushion member 2 is viewed from below. The recessed portions 10 is described in detail below.

Each recessed portion 10 is a substantially hemispherical or oval recess. As illustrated in FIG. 6, a lower end of each recessed portion 10 is an open end. Moreover, as illustrated in this figure, an upper end of each recessed portion 10 is positioned slightly lower than an upper end surface (i.e., a surface receiving a load from the passenger(s)) of the cushion member 2 in the thickness direction of the cushion member 2.

As illustrated in FIG. 7, the recessed portions 10 are formed at equal intervals across substantially the entirety of the bottom portion 2x of the cushion member 2. That is, the bottom portion 2x at each of the front hip support portion 2a, the back hip support portion 2b, and the non-supporting portion 2c are provided with the recessed portions 10 such that the distance (indicated by a character "d" in FIG. 7) between adjacent ones of the recessed portions 10 is uniform.

A formation pattern of the recessed portions 10 in the present embodiment is described with reference to FIG. 7. In a line at the center of the bottom portion 2x of the cushion member 2 in the width direction, seven recessed portions 10 are arranged in line along the front-to-back direction. In each line at the side of the center line, seven recessed portions 10 are arranged along the front-to-back direction. In each line on a further outer side in the width direction, five recessed portions 10 are arranged in the front-to-back direction.

The formation position of each recessed portion 10 in the line at the center of the bottom portion 2x of the cushion member 2 in the width direction shifts, by a predetermined distance, in the front-to-back direction from the formation position of a corresponding one of the recessed portions 10 in the lines at the side of the center line. Moreover, the formation position of each recessed portion 10 in the outermost lines in the width direction at the bottom portion 2x of the cushion member 2 also shifts, by the predetermined distance, in the front-to-back direction from the formation position of a corresponding one of the recessed portions 10 in adjacent lines of the outermost lines. As described above, in the present embodiment, the lines of the recessed portions 10 are formed in the width direction, and the recessed portions 10 of these lines are arranged in a zigzag pattern. That is, the recessed portions 10 in each line are formed respectively at positions shifted (e.g., offset) in the front-to-back direction and the width direction from the recessed portions 10 in adjacent lines.

As described above, the recessed portions 10 are formed at the bottom portion 2x of the cushion member 2, and therefore, the weight of the cushion member 2 is further reduced. Moreover, since the recessed portions 10 are formed at the bottom portion 2x of the cushion member 2, the cushion member 2 can receive a load from the passenger(s) to favorably bend when the passenger(s) is seated on the vehicle seat 1. The above-described effect of improving the flexibility of the cushion member 2 is more notably produced by the recessed portions 10 equally provided at the bottom portion 2x of the cushion member 2.

Note that the formation pattern of the recessed portions 10 illustrated in FIG. 7 has been set forth as a mere example, and the number of recessed portions 10 and the formation positions of the recessed portions 10 may be set such that the distance d between adjacent ones of the recessed portions 10 is uniform. The present disclosure is not limited to the above-described pattern. Moreover, the shape of the recessed portion 10 is not limited to the substantially hemispherical shape and the substantially oval shape, and may be other shapes (e.g., a rectangular cylindrical shape).

In an embodiment, each air cell 20 is a bag body made of a material capable of suitable stretching, such as a resin material including, e.g., polyethylene and polyurethane. The air cell 20 is configured to expand by injection of compressed air and to contract by discharge of the injected air. Moreover, the air cell 20 of the present embodiment is a bag body with a two-tiered structure as illustrated in FIG. 2.

More specifically, the air cell 20 of the present embodiment includes two expandable portions vertically arranged to sandwich a narrowed portion 23 equivalent to a dividing portion. Of two expandable portions, an upper expandable portion 21 positioned on an upper side is a biconvex bag body configured to expand such that both of upper and lower ends thereof protrude by injection of compressed air. A lower expandable portion 22 positioned on a lower side has a size slightly larger than that of the upper expandable portion 21, and is a biconvex bag body similar to the upper expandable portion 21.

The inside of the upper expandable portion 21 and the inside of the lower expandable portion 22 communicate with each other. Moreover, a lower end portion of the lower expandable portion 22 has a compressed air injection port 24. When compressed air is supplied into the lower expandable portion 22 through the injection port 24, the lower expandable portion 22 expands, and then, the upper expandable portion 21 expands. In this state, the upper expandable portion 21 and the lower expandable portion 22 expand along an upper-to-lower direction, i.e., the direction in which two expandable portions are arranged. Note that the configuration in which the upper expandable portion 21 and the lower expandable portion 22 as two expandable portions are vertically arranged has been described as an example. However, in the present disclosure, the number of expandable portions is not limited, and it may be configured that two or more expandable portions are arranged.

Figure 8:
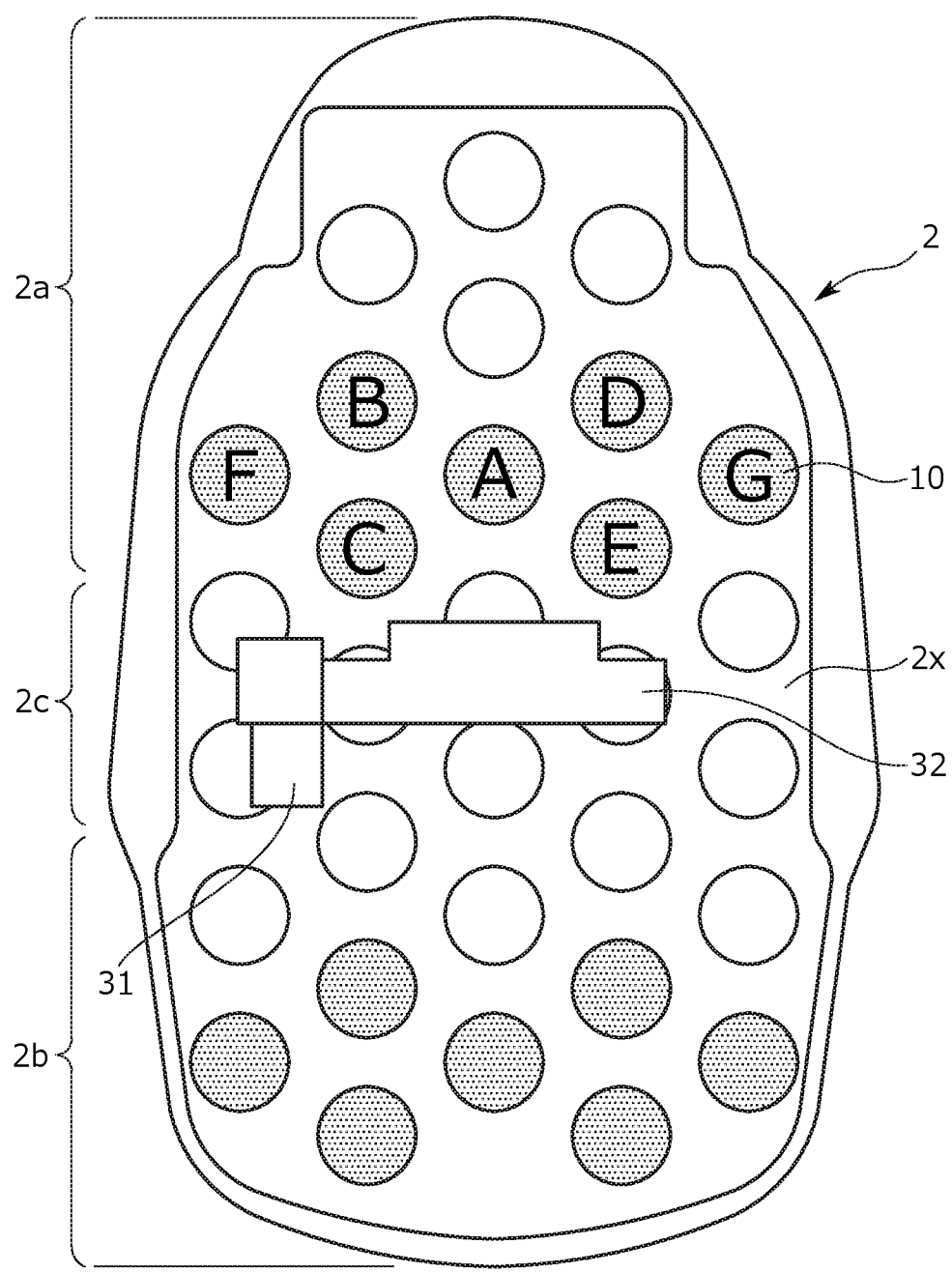
FIG. 8 is a bottom view of arrangement positions of the air cells, the compressed air generation device, and the switching device, according to an embodiment.

In the present embodiment, the air cells 20 are attached to the bottom portion 2x of the cushion member 2. More specifically, the air cells 20 are arranged respectively in the recessed portions 10 provided at the bottom portion 2x of the hip support portions 2a, 2b of the cushion member 2. The arrangement positions of the air cells 20 at the cushion member 2 is described below with reference to FIG. 8. FIG. 8 is a bottom view of the arrangement positions of the air cells 20, the air supply pump 31, and the valve unit 32 at the cushion member 2.

At the bottom portion 2x of the front hip support portion 2a of the cushion member 2, the recessed portions 10 are provided symmetrically as illustrated in FIG. 8. These recessed portions 10 are divided into recessed portions 10 provided in a region positioned on the front side with respect to the crotch position of the passenger at the front hip support portion 2a (hereinafter referred to as "front recessed portions 10") and recessed portions 10 provided in a region positioned right below the crotch, hip, and thighs of the passenger at the hip support portion 2a (hereinafter referred to as "back recessed portions 10"). Note that in FIG. 8, the front recessed portions 10 of the recessed portions 10 provided at the front hip support portion 2a are indicated by white circles, and the back recessed portions 10 are indicated by circles with a dot pattern.

In the present embodiment, the air cells 20 are arranged respectively in the back recessed portions 10 of the recessed portions 10 provided at the front hip support portion 2a. Specifically, the back recessed portions 10 include a recessed portion 10 (a recessed portion 10 indicated by a reference character "A" in FIG. 8) positioned at a center portion of the cushion member 2 in the width direction, recessed portions 10 (recessed portions 10 indicated by reference characters "B," "C," "D," and "E" in FIG. 8) arranged around the recessed portion 10 indicated by A in a substantially rectangular pattern, and recessed portions (recessed portions 10 indicated by reference characters "F" and "G" in FIG. 8) positioned respectively at end portions of the cushion member 2 in the width direction. The single air cell 20 is arranged inside each of these recessed portions 10.

As described above, in the present embodiment, the air cells 20 are respectively arranged only in the back recessed portions 10 of the front and back recessed portions 10. Note that the present disclosure is not limited to such a configuration, and the air cells 20 may be also arranged respectively in the front recessed portions 10.

Each of the back recessed portions 10 is, as described above, disposed such that a distance between adjacent ones of the recessed portions 10 is uniform. Thus, the air cells 20 arranged respectively in the back recessed portions 10 are also arranged such that a distance between adjacent ones of the air cells 20 is uniform.

The above-described arrangement pattern of the air cells 20 at the front hip support portion 2*a* is substantially similar to that of the air cells 20 at the back hip support portion 2*b*. Specifically, the recessed portions 10 are also provided symmetrically at the bottom portion 2*x* of the back hip support portion 2*b*. These recessed portions 10 are divided into front recessed portions 10 (recessed portions 10 indicated by white circles in FIG. 8) and back recessed portions 10 (recessed portions 10 indicated by circles with a dot pattern in FIG. 8). The air cells 20 are respectively arranged only in the back recessed portions 10 of the front and back recessed portions 10. Note that the present disclosure is not limited to such a configuration, and the air cells 20 may be also arranged respectively in the front recessed portions 10.

Figure 9:
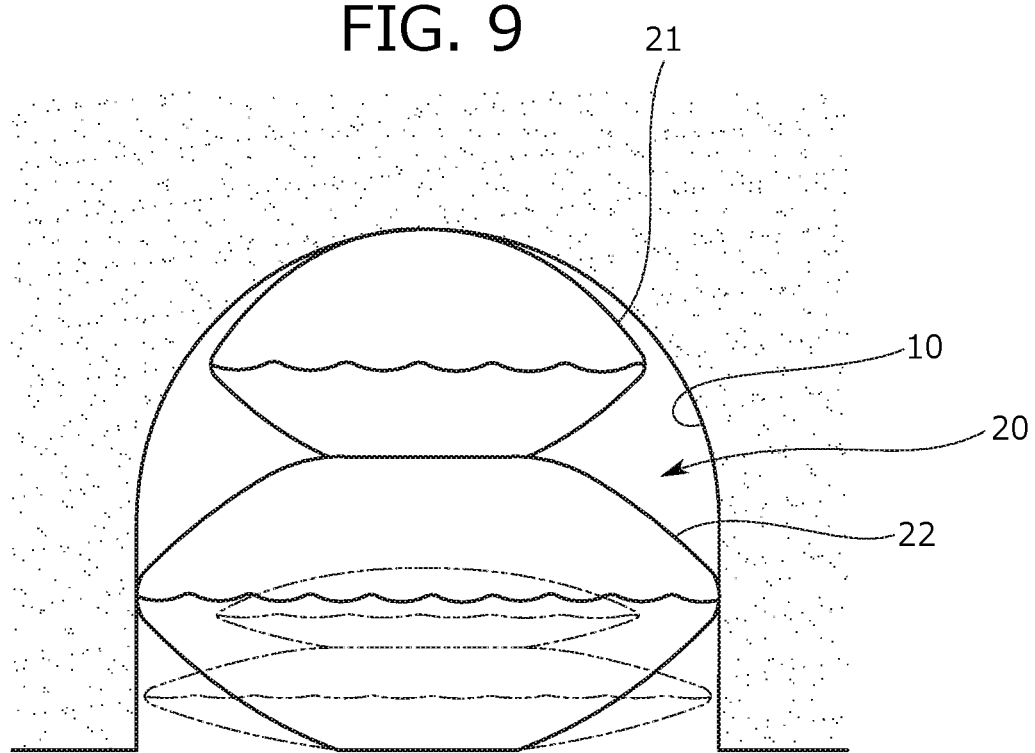
FIG. 9 is a schematic cross-sectional view for describing operation of the air cell, according to an embodiment.

Next, operation of the air cell 20 in the recessed portion 10 is described with reference to FIG. 9. FIG. 9 is a schematic cross-sectional view for describing operation of the air cell 20. As illustrated in FIG. 9, the air cell 20 is disposed in the recessed portion 10 such that two expandable portions are arranged along the upper-to-lower direction (i.e., the thickness direction of the vehicle seat 1). Thus, each air cell 20 expands/contracts along the thickness direction of the vehicle seat 1 in a corresponding one of the recessed portions 10. The "corresponding one of the recessed portions 10" for each air cell 20 is one, in which such an air cell 20 is disposed, of the recessed portions 10 formed at the bottom portion 2*x* of the cushion member 2.

On the other hand, the recessed portion 10 is formed to have a slightly-larger size than that of the air cell 20 in a maximum expansion state. Thus, each air cell 20 expands/contracts in a corresponding one of the recessed portions 10 as illustrated in FIG. 9, and slightly contacts an upper end (the ceiling) of a corresponding one of the recessed portions 10 when the air cell 20 expands to the maximum extent.

As described above, each air cell 20 expands in a corresponding one of the recessed portions 10, and is housed in such a recessed portion 10 even when the air cell 20 expands to the maximum extent. Thus, when the air cell 20 expands, the cushion member 2 (specifically, a portion of the cushion member 2 at the periphery of a corresponding one of the recessed portions 10) is not pushed out by the air cell 20. That is, in the present embodiment, each air cell 20 expands/contracts without providing influence on the outer shape (specifically, the shape of a seat seating surface) of the vehicle seat 1.

In the present embodiment, the hardness of the vehicle seat 1 can be adjusted by expansion/contraction operation of each air cell 20. More specifically, the expansion pressure of each air cell 20 is adjusted so that the hardness of a portion of the vehicle seat 1 provided with such an air cell 20 (in other words, a portion provided with the recessed portion 10) can be freely changed. With this configuration, the vehicle seat 1 provides a favorable ride quality (a favorable seating feeling) to the passenger(s) while ensuring a suitable level of hardness. Since the suitable level of hardness is ensured, sinking (elastic deterioration) of the seat caused due to continuous application of a passenger's seating pressure for a long period of time can be reduced.

Note that in the present embodiment, each air cell 20 expands/contracts, as described above, along the thickness direction of the vehicle seat 1 in a corresponding one of the recessed portions 10. With such expansion/contraction operation of the air cell 20, the hardness of the vehicle seat 1 can be effectively adjusted.

Moreover, in the present embodiment, the air cells 20 are equally arranged at the bottom portion 2*x* of the cushion member 2. With this configuration, the hardness of the vehicle seat 1 can be adjusted with a favorable balance. Further, in the present embodiment, the air cells 20 can separately expand/contact. With this configuration, the hardness can be locally adjusted for each portion (for example, for each region of the hip support portions 2*a*, 2*b*) of the cushion member 2. As a result, a higher-hardness (or a lower-hardness) portion of the cushion member 2 can be switched depending the situation.

Figure 10:
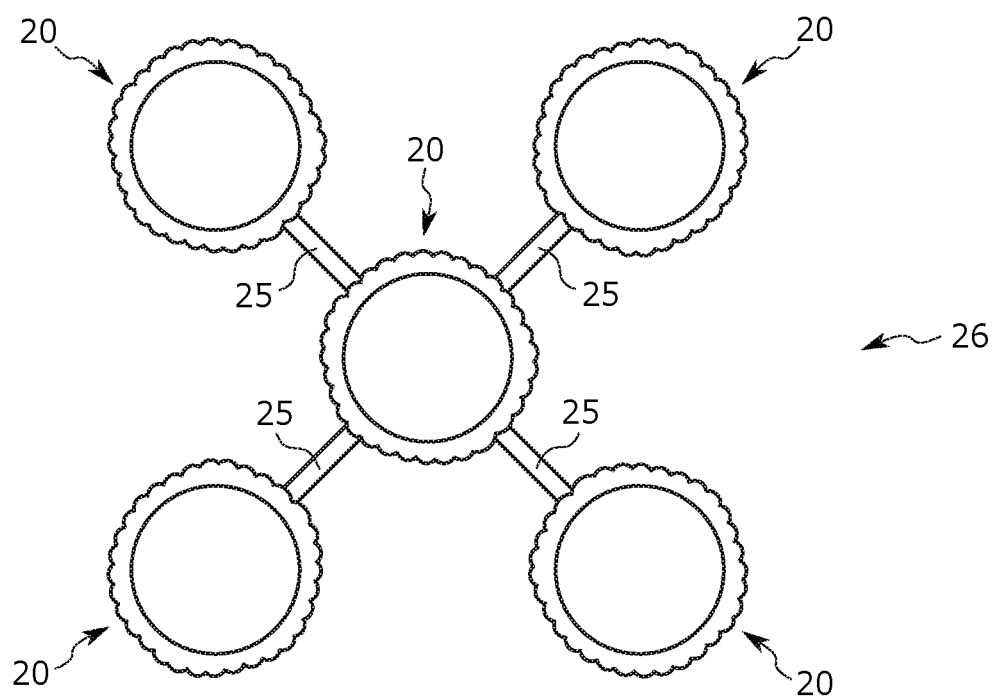
FIG. 10 is a schematic plan view of air cells, according to an embodiment.

Note that in the present embodiment, the air cells 20 are separated from each other. Moreover, in order to expand each air cell 20, compressed air is supplied separately to the air cells 20. Note that the present disclosure is not limited to such a configuration, and as illustrated in FIG. 10, an air cell group 26 including some air cells 20 (five air cells 20 in FIG. 10) which are included in the air cells 20 arranged at the cushion member 2 and which are coupled together may be used to collectively supply air to each air cell 20 of the air cell group 26. FIG. 10 is a schematic plan view of the above-described air cell group 26 as a variation of the air cells 20, and is a schematic plan view of the air cell group 26.

The configuration of the air cell group 26 is described with reference to FIG. 10. In the air cell group 26, one of the air cells 20 (specifically, the air cell 20 positioned at the center) is coupled to the other air cells 20 (specifically, the air cells 20 surrounding the center air cell 20) through communication portions 25. The communication portion 25 is a portion provided for communication among internal spaces of the air cells 20. That is, the internal space of the center air cell 20 and the internal spaces of other air cells 20 communicate with each other through the communication portions 25.

In the air cell group 26 configured as described above, when compressed air is supplied to one of the air cells 20, the compressed air is supplied to all of the air cells 20 of the air cell group 26 through the communication portions 25. As a result, all of the air cells 20 of the air cell group 26 can be collectively expanded. Moreover, according to the above-described configuration, the coupled air cells 20 can be collectively handled. Further, the process for attaching the air cells 20 can be further facilitated.

As described above, when compressed air is supplied to the air cells 20, the compressed air may be supplied separately to the air cells 20, or may be supplied collectively to a group unit of the air cells 20 such as the above-described air cell group 26.

The fluid supply mechanism 30 is configured to supply compressed air to each air cell 20. Moreover, in the present embodiment, the fluid supply mechanism 30 is capable of supplying compressed air to at least one of the air cells 20 to expand only such air cells 20. Further, the fluid supply mechanism 30 is capable of switching a compressed air supply destination to change the air cells 20 to be expanded. A detailed configuration of the fluid supply mechanism 30 is described below with reference to FIGS. 3, 4, and 8.

A mechanical configuration of the fluid supply mechanism 30 is described. The fluid supply mechanism 30 includes the air supply pump 31, the valve unit 32, and the tubes 33 as illustrated in FIG. 4. Moreover, the fluid supply mechanism 30 includes, as control system units, an electronic control unit (ECU) 34 and a sensor 35. Although details are described below, the fluid supply mechanism 30 includes the mountain pass road switch 36 configured to transmit, to the ECU 34, a signal for bringing a state suitable when the motorcycle travels on a mountain pass road.

The air supply pump 31 is a compressed air generation device configured to generate compressed air, and includes a compact air pump. The valve unit 32 is equivalent to a switching device, and operates to switch the supply destination of the compressed air generated by the air supply pump 31. Specifically, the valve unit 32 has a plurality of compressed air discharge ports. Moreover, an electromagnetic valve (not shown) is provided in the valve unit 32. The valve unit 32 operates to switch the electromagnetic valves ON or OFF to switch one(s) of the discharge ports through which compressed air is actually discharged.

The tubes 33 are connected respectively into the discharge ports as illustrated in FIG. 4. Each tube 33 is equivalent to a supply path formation member, and forms a compressed air supply path. Moreover, each tube 33 is connected to the compressed air injection port 24 of a corresponding one of the air cells 20. Thus, when the valve unit 32 switches the discharge port(s) through which compressed air is actually discharged, the compressed air supply destination (i.e., the air cells 20 to which compressed air is sent) is switched.

Note that in the present embodiment, the air supply pump 31 and the valve unit 32 are, as in the air cells 20, attached to the bottom portion 2x of the cushion member 2. The arrangement positions of the air supply pump 31 and the valve unit 32 is described. As illustrated in FIG. 8, in the present embodiment, the air supply pump 31 and the valve unit 32 are attached to the bottom portion 2x of the non-supporting portion 2c of the cushion member 2. That is, in the present embodiment, the air supply pump 31 and the valve unit 32 are arranged at positions different from the seating portions 1a, 1b in the vehicle seat 1. With such arrangement positions, influence of the above-described devices on the ride quality can be reduced.

The ECU 34 is equivalent to a control device, and is configured to control ON/OFF of the air supply pump 31 and to control the valve unit 32 to switch the compressed air supply destination. That is, the ECU 34 controls the valve unit 32 to switch ones, which are to be actually expanded, of the air cells 20.

Moreover, the ECU 34 of the present embodiment controls the valve unit 32 according to the output signal of the sensor 35 or the mountain pass road switch 36. The sensor 35 is a sensor configured to output a signal corresponding to a traveling condition of the motorcycle on which the vehicle seat 1 is mounted. Specifically, the sensor 35 of the present embodiment is configured to detect a location where the motorcycle is currently traveling and to output a signal corresponding to a detection result. More specifically, the sensor 35 outputs a first signal (hereinafter referred to as a "city traveling signal") when the motorcycle is traveling around a city, and outputs a second signal (hereinafter referred to as a "freeway traveling signal") when the motorcycle is traveling along a freeway.

Note that the above-described sensor 35 includes, for example, an image sensor, a speed sensor, or an acceleration sensor, but may be set to have other suitable configurations as long as the sensor 35 can detect the traveling location of the motorcycle.

The mountain pass road switch 36 is turned ON/OFF by the passenger in the situation where the motorcycle is traveling on the mountain pass road. When the passenger turns ON the mountain pass road switch 36, the mountain pass road switch 36 outputs a third signal (hereinafter referred to as a "mountain pass road traveling signal").

When the ECU 34 receives the output signal from the sensor 35 or the mountain pass road switch 36, the ECU 34 analyzes such a signal to specify the location where the motorcycle is currently traveling. The ECU 34 controls the valve unit 32 according to a traveling location specified result. Thus, ones, which are to be actually expanded, of the air cells 20 are automatically switched according to the traveling location of the motorcycle. As a result, a higher-hardness (or a lower-hardness) portion of the vehicle seat 1 automatically changes depending on the traveling location of the motorcycle. Further, the air cells 20 to be expanded may be manually switched by the passenger according to a passenger's preference.

Operation Example of Seat Apparatus

Figure 11:
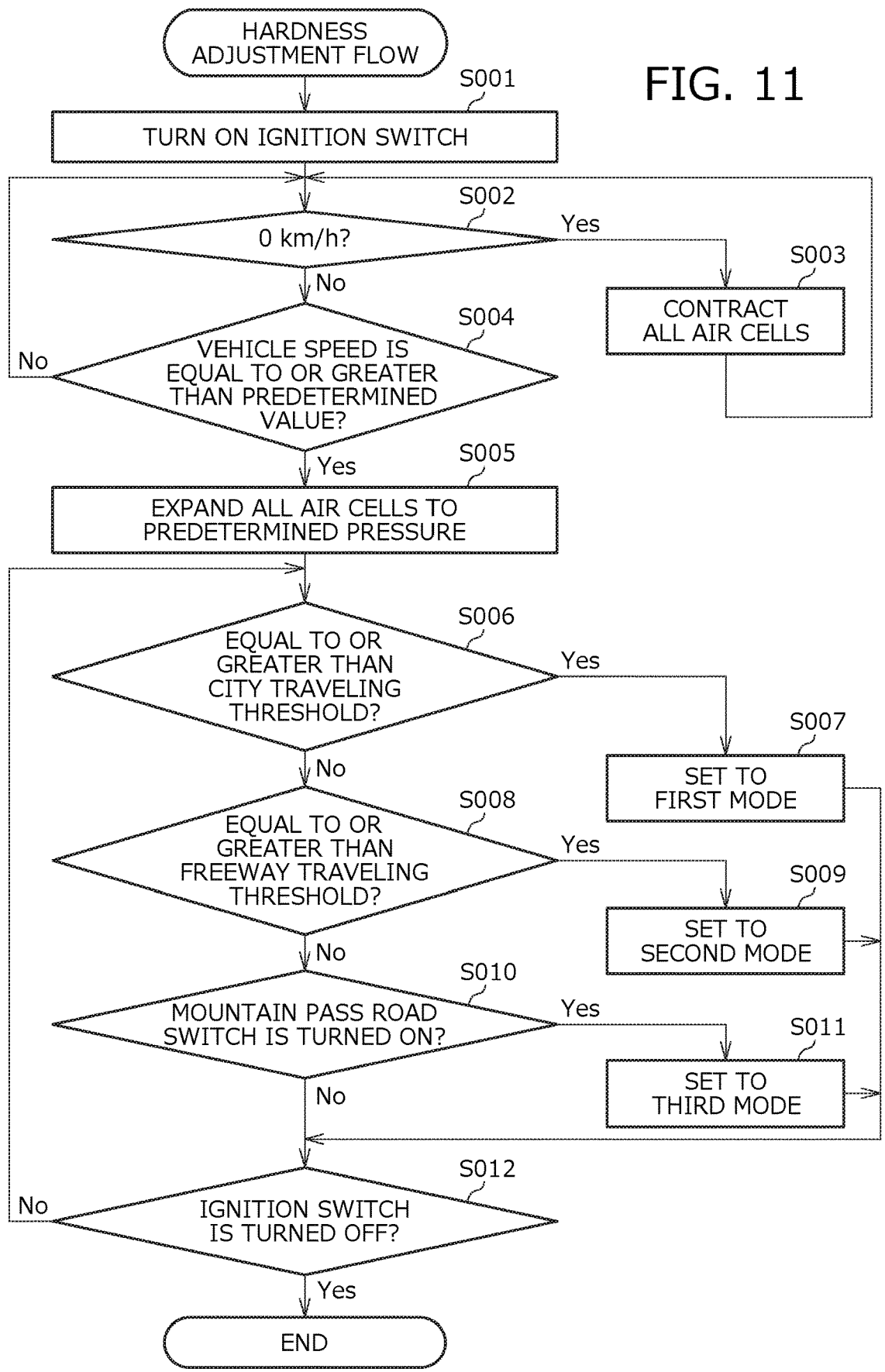
FIG. 11 is an example flowchart of a hardness adjustment flow, according to an embodiment.

Next, an operation example of the present device 100 is described. Specifically, the flow of control of the valve unit 32 by the ECU 34, i.e., the flow of hardness adjustment of each portion of the vehicle seat 1 (hereinafter referred to as a "hardness adjustment flow"), is described with reference to FIG. 11. FIG. 11 is a flowchart of the hardness adjustment flow. Note that the case where there is only one passenger, i.e., the case (hereinafter referred to as a "present case") where a passenger is seated only on the front seating portion 1a of the vehicle seat 1, is described as a specific example.

In the hardness adjustment flow of the present case, the air cells 20 arranged respectively in the recessed portions 10 (for example, the back recessed portions 10) at the bottom portion 2x of the front hip support portion 2a of the cushion member 2 are expanded. Specifically, the hardness adjustment flow begins when an ignition switch of the motorcycle is turned ON with the passenger being seated on the vehicle seat 1 (S001). Next, the ECU 34 determines whether or not the traveling speed (the vehicle speed) of the motorcycle is 0 km/h (S002), and when such a speed is 0 km/h, the air supply pump 31 and the valve unit 32 are controlled such that all of the air cells 20 arranged respectively in the back recessed portions 10 are contracted (S003).

On the other hand, when the vehicle speed reaches equal to or greater than a predetermined value (S004), the ECU 34 turns ON the air supply pump 31, and controls the valve unit 32 to supply compressed air to all of the air cells 20 arranged respectively in the back recessed portions 10. In this manner, all of the air cells 20 arranged respectively in the back recessed portions 10 gradually expand to a predetermined pressure (S005).

Subsequently, the ECU 34 cooperates with the sensor 35 to monitor the traveling location of the motorcycle, and controls the valve unit 32 according to the traveling location. Specifically, e.g., the ECU 34 compares the traveling speed detected from the sensor 35 with a threshold stored in a memory 34a of the ECU 34 (S006). There are two types of thresholds stored in the memory 34a, and one of the thresholds is a threshold used for determining whether or not the motorcycle is traveling around the city, i.e., a city traveling threshold. The other threshold is a threshold used for determining whether or not the motorcycle is traveling along the freeway, i.e., a freeway traveling threshold. These two thresholds are preset values, and examples thereof include the city traveling threshold set within a range of 10 to 60 km per hour, particularly 30 km per hour in the present embodiment. Moreover, the freeway traveling threshold is set within a range of 60 to 10 km per hour, particularly 70 km per hour in the present embodiment. Note that the city traveling threshold and the freeway traveling threshold are not limited to the above-described values, and can be set at other suitable values.

Figure 12:
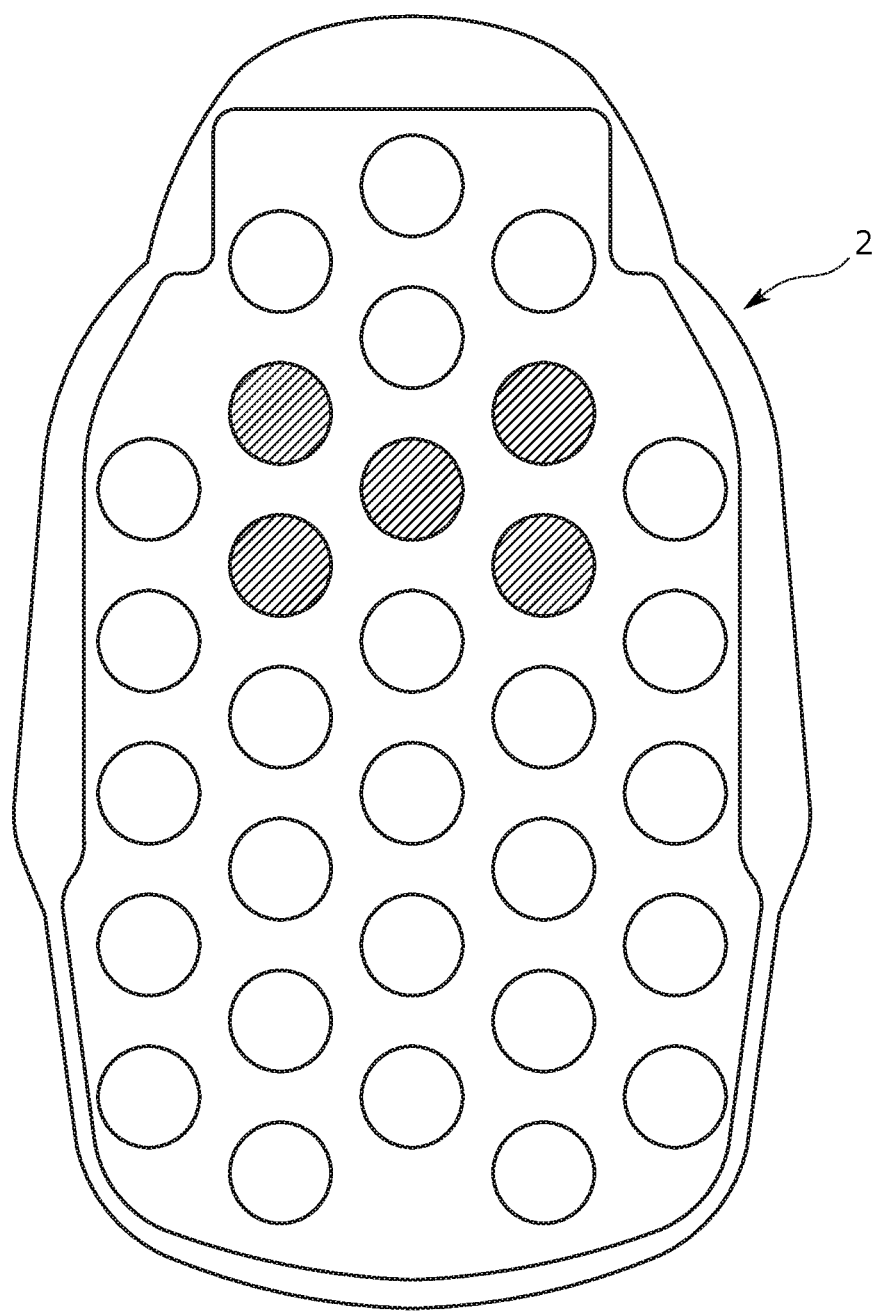
FIG. 12 is a bottom view of a bottom portion of the cushion member, illustrating a first mode of the modes for expanding the air cells, according to an embodiment.

When the traveling speed reaches equal to or greater than the city traveling threshold by the signal obtained from the sensor 35, the ECU 34 controls the valve unit 32 in a first mode (S007). The "first mode" described herein is the following mode as illustrated in FIG. 12: of the air cells 20 arranged respectively in the back recessed portions 10, the air cell 20 positioned at the center of the seat in the width direction and the air cells 20 surrounding such a center air cell 20 are expanded and the air cells 20 positioned at seat end portions in the width direction are not expanded. FIG. 12 is a bottom view for describing the first mode. Note that in FIG. 12 and FIGS. 13 and 14 as described below, the air cell 20 to be expanded is indicated by a circle having a hatch pattern.

As described above, while the motorcycle is traveling around the city, the ECU 34 controls the valve unit 32 to expand the air cells 20 in the first mode. During such a period, the hardness of the end portions of the vehicle seat 1 in the width direction, i.e., the hardness of a portion of the vehicle seat 1 on which the thighs of the passenger are placed, does not increase, and can relatively easily bend. This reflects that ground accessibility (easy grounding of feet at the time of stoppage) is more emphasized while the motorcycle is traveling around the city and that the end portions of the cushion member 2 in the width direction need to easily bend to ensure the ground accessibility.

Figure 13:
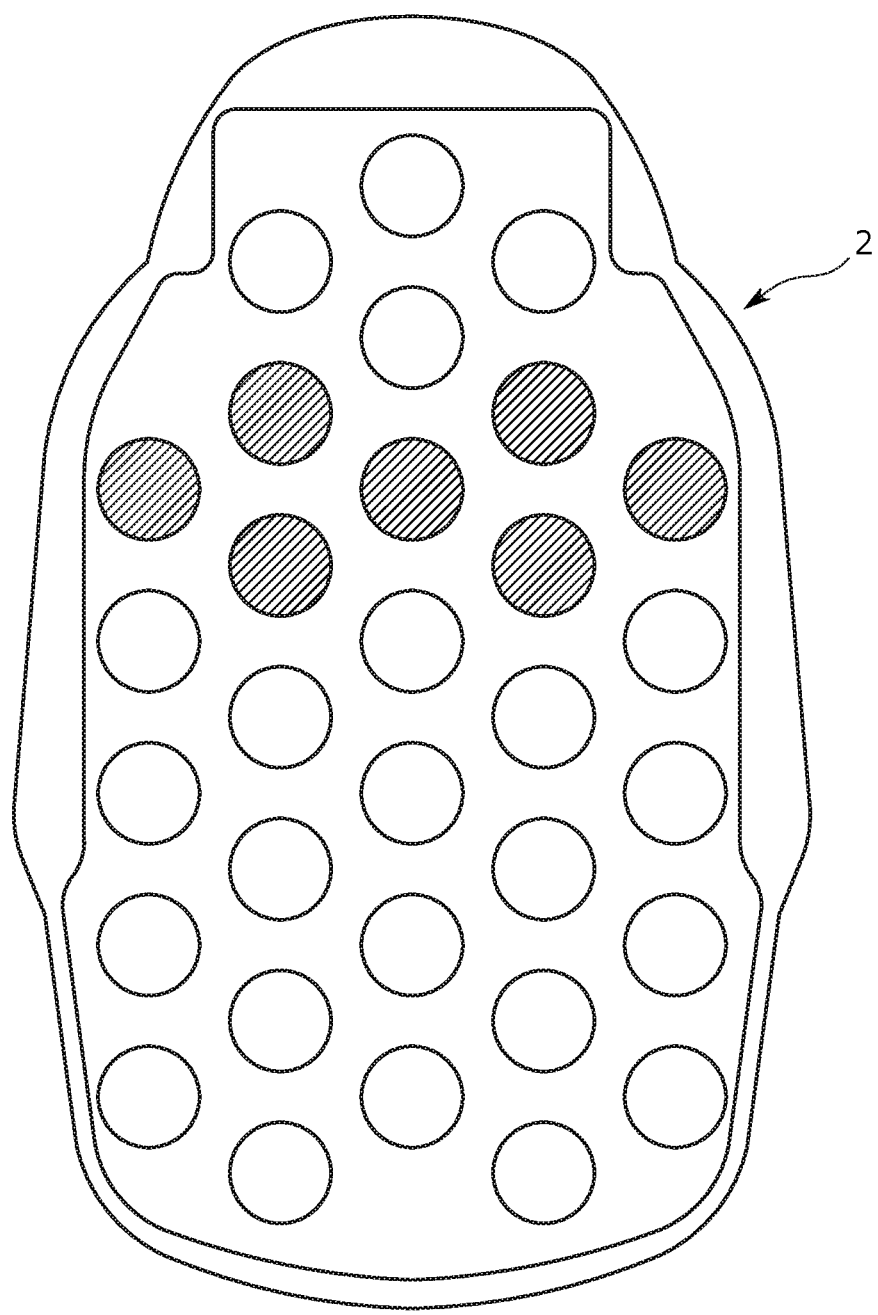
FIG. 13 is a bottom view of the bottom portion of the cushion member, illustrating a second mode of the modes for expanding the air cells, according to an embodiment.

On the other hand, in comparison between the traveling speed detected from the sensor 35 and each threshold stored in the memory 34a of the ECU 34 (S008), when the traveling speed reaches a value equal to or greater than the freeway traveling threshold by the signal obtained from the sensor 35, the ECU 34 controls the valve unit 32 in a second mode (S009). The "second mode" described herein is, as illustrated in FIG. 13, a mode in which all of the air cells 20 arranged respectively in the back recessed portions 10 are expanded. FIG. 13 is a bottom view for describing the second mode.

As described above, while the motorcycle is traveling along the freeway, the ECU 34 controls the valve unit 32 to expand the air cells 20 in the second mode. During such a period, the hardness of each portion of the front seating portion 1a increases. This reflects that while the motorcycle is traveling along the freeway, the vehicle seat 1 (for example, the cushion member 2) continuously receives the seating pressure from the passenger for a long period of time, and lowering of the elasticity of the cushion member 2 due to such seating pressure needs to be suppressed.

Figure 14:
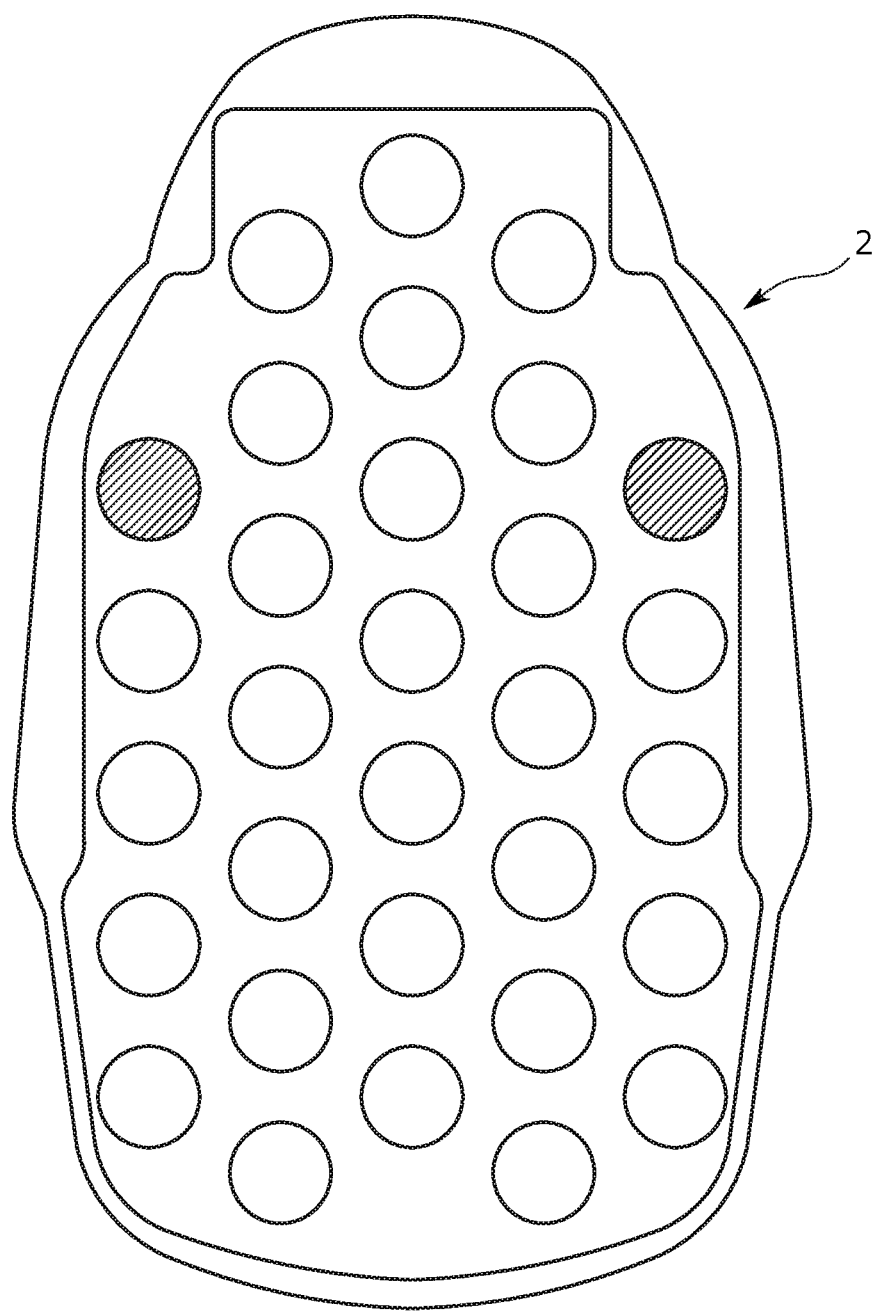
FIG. 14 is a bottom view of the bottom portion of the cushion member, illustrating a third mode of the modes for expanding the air cells, according to an embodiment.

When the passenger turns ON the mountain pass road switch 36 while the motorcycle is traveling on the mountain pass road (S010), the ECU 34 controls the valve unit 32 in a third mode by the signal obtained from the mountain pass road switch 36 (S011). The "third mode" described herein is the following mode as illustrated in FIG. 14: of the air cells 20 arranged respectively in the back recessed portions 10, the air cells 20 positioned respectively at the seat end portions in the width direction are expanded and the air cell 20 positioned at the center of the seat in the width direction and the air cells 20 surrounding such a center air cell 20 are not expanded. FIG. 14 is a bottom view for describing the third mode.

As described above, while the motorcycle is traveling on the mountain pass road, the ECU 34 controls the valve unit 32 to expand the air cells 20 in the third mode. During such a period, the hardness of the end portions of the vehicle seat 1 in the width direction, i.e., the hardness of the portion of the vehicle seat 1 on which the thighs of the passenger are placed, increases. On the other hand, the hardness of a center portion of the vehicle seat 1 in the width direction, i.e., the hardness of a portion of the vehicle seat 1 on which the hip of the passenger is placed, does not increase, and is held in a relatively-easily bendable state. This reflects that while the motorcycle is traveling on the mountain pass road, when the motorcycle reaches a curved road and the passenger performs a cornering operation, the hardness of each seat portion is set such that the cornering operation is easily performed. More specifically, when the passenger performs the cornering operation, a seating posture is stabilized as long as the hip of the passenger sinks in the seat and the thighs of the passenger are lifted. This allows the passenger to more easily perform the cornering operation.

Monitoring of the traveling location, setting of the control mode according to the traveling location, and control of the valve unit 32 based on the set mode as described above are repeated until the ignition switch is turned OFF. When the ignition switch is turned OFF (S012), the ECU 34 turns OFF the air supply pump 31. Accordingly, the compressed air sealed in the expanded air cells 20 is discharged. At this point, the hardness adjustment flow ends.

As described above, in the present embodiment, the hardness of each portion of the seating portion 1a of the vehicle seat 1 automatically changes according to the traveling location of the motorcycle. Thus, a hardness balance in the seating portion 1a can be optimized to the contents suitable for the traveling location.

Variation of Seating Device of the Present disclosure

Figure 15:
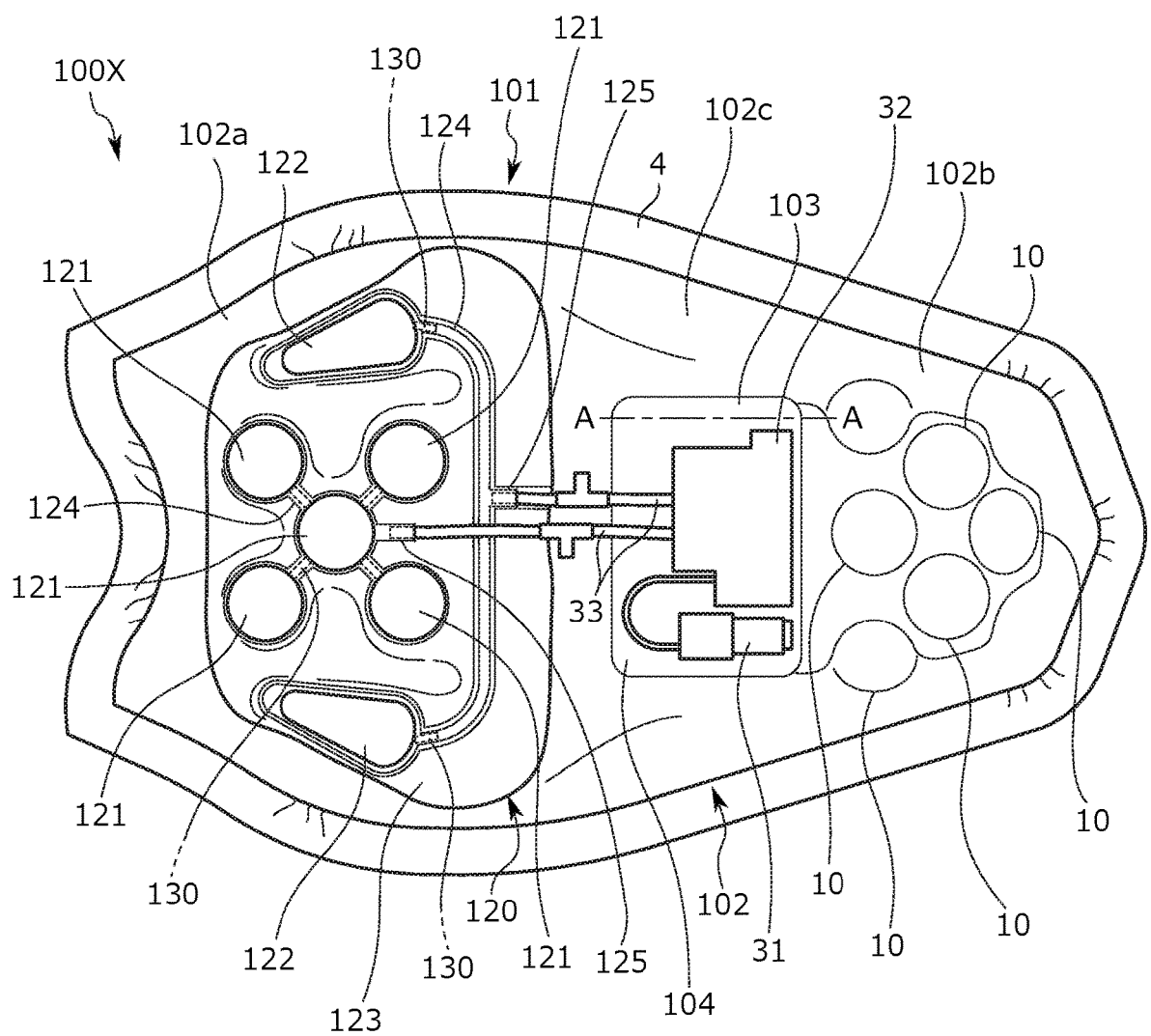
FIG. 15 is a schematic view of a bottom portion of a cushion member and various types of equipment disposed on the bottom portion, according to an embodiment.
Figure 16:
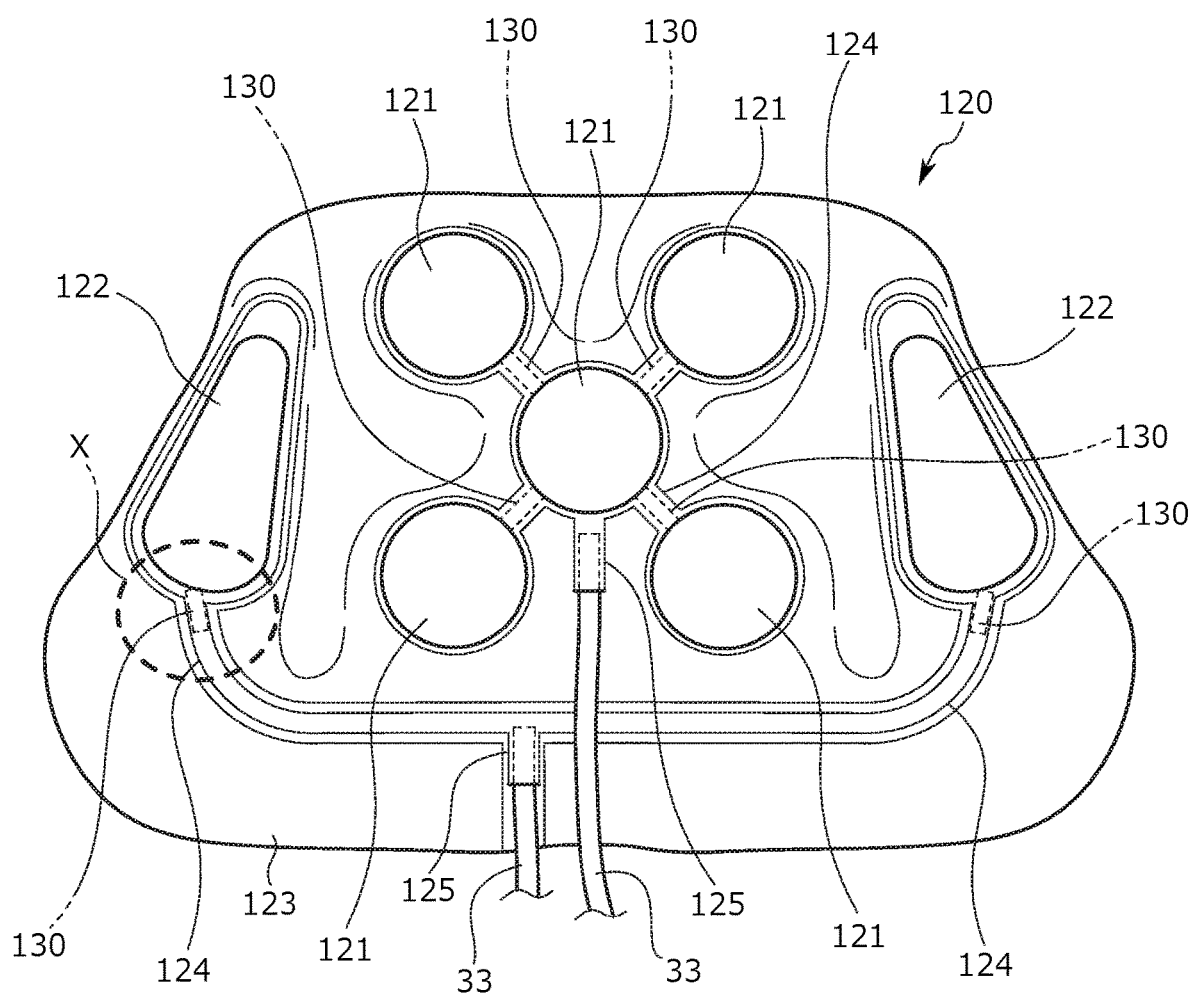
FIG. 16 is a plan view of an air cell unit, according to an embodiment.
Figure 17:
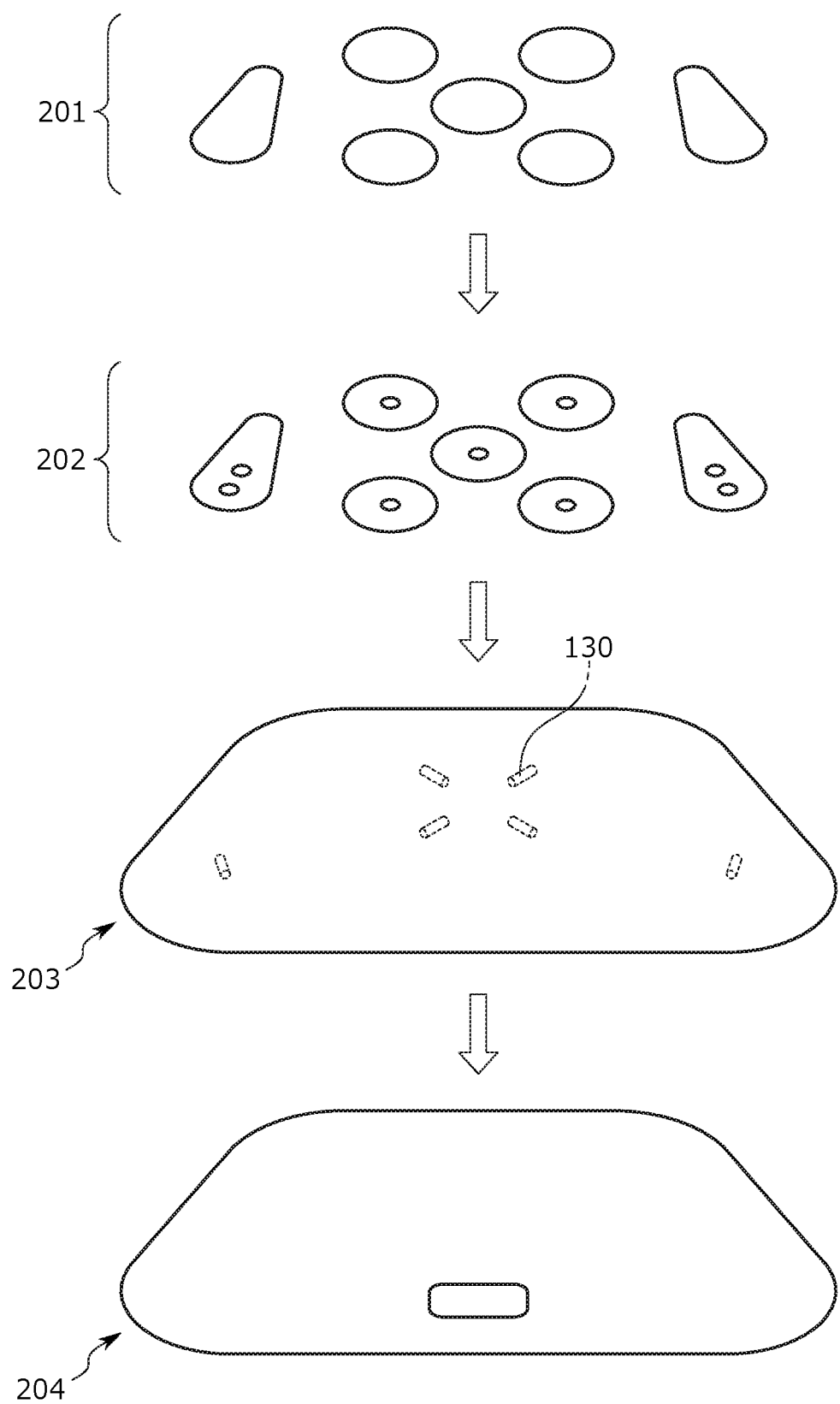
FIG. 17 is an exploded, perspective view of the air cell unit, according to an embodiment.
Figure 18A:
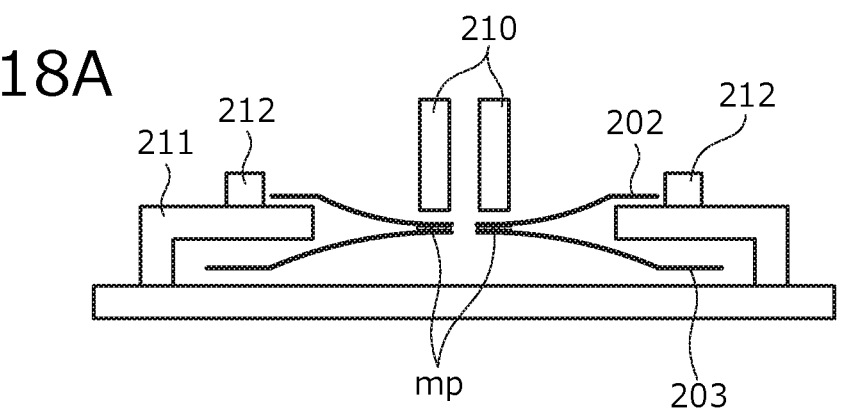
FIG. 18A is a side, schematic view of an assembly step of the air cell unit (No. 1), according to an embodiment.
Figure 18B:
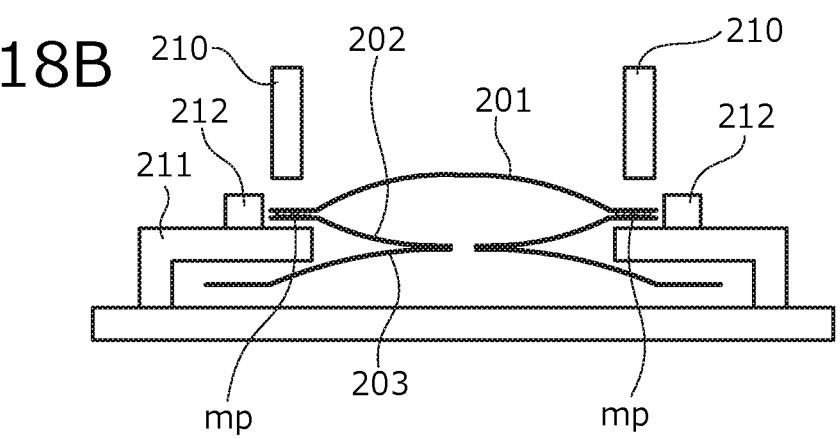
FIG. 18B is a side, schematic view of another assembly step of the air cell unit (No. 2), according to an embodiment.
Figure 18C:
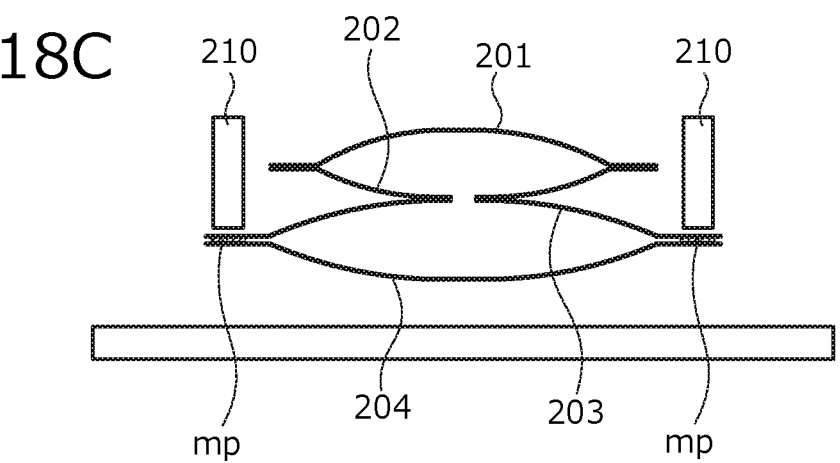
FIG. 18C is a side, schematic view of still another assembly step of the air cell unit (No. 3), according to an embodiment.
Figure 19A:
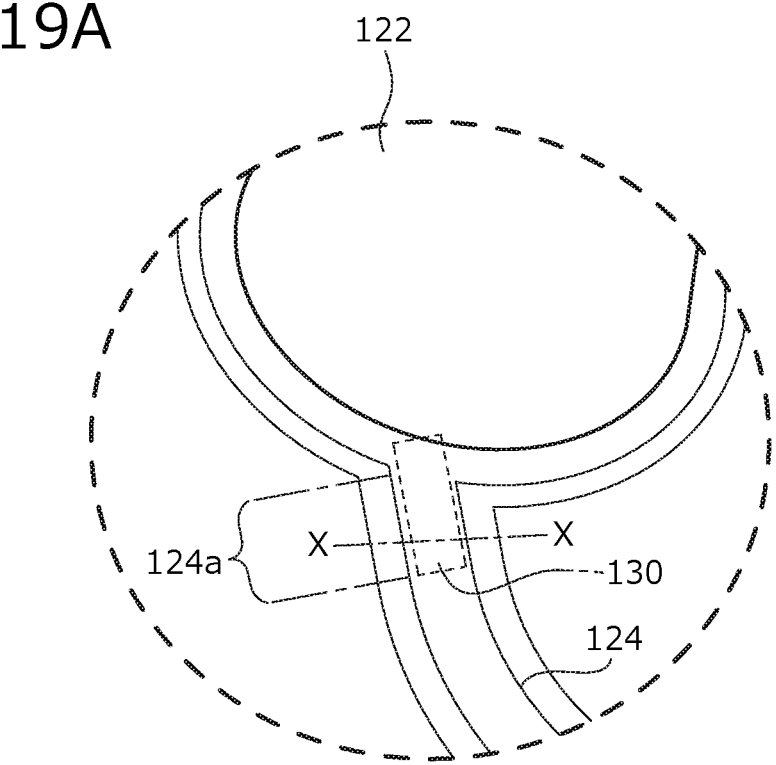
FIG. 19A is an enlarged, partial schematic view of a region X of FIG. 16, according to an embodiment.
Figure 19B:
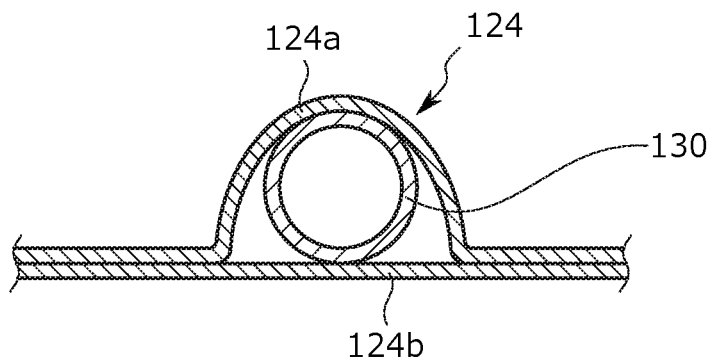
FIG. 19B is a schematic cross-sectional view along an X-X line of FIG. 19A, according to an embodiment.
Figure 20:
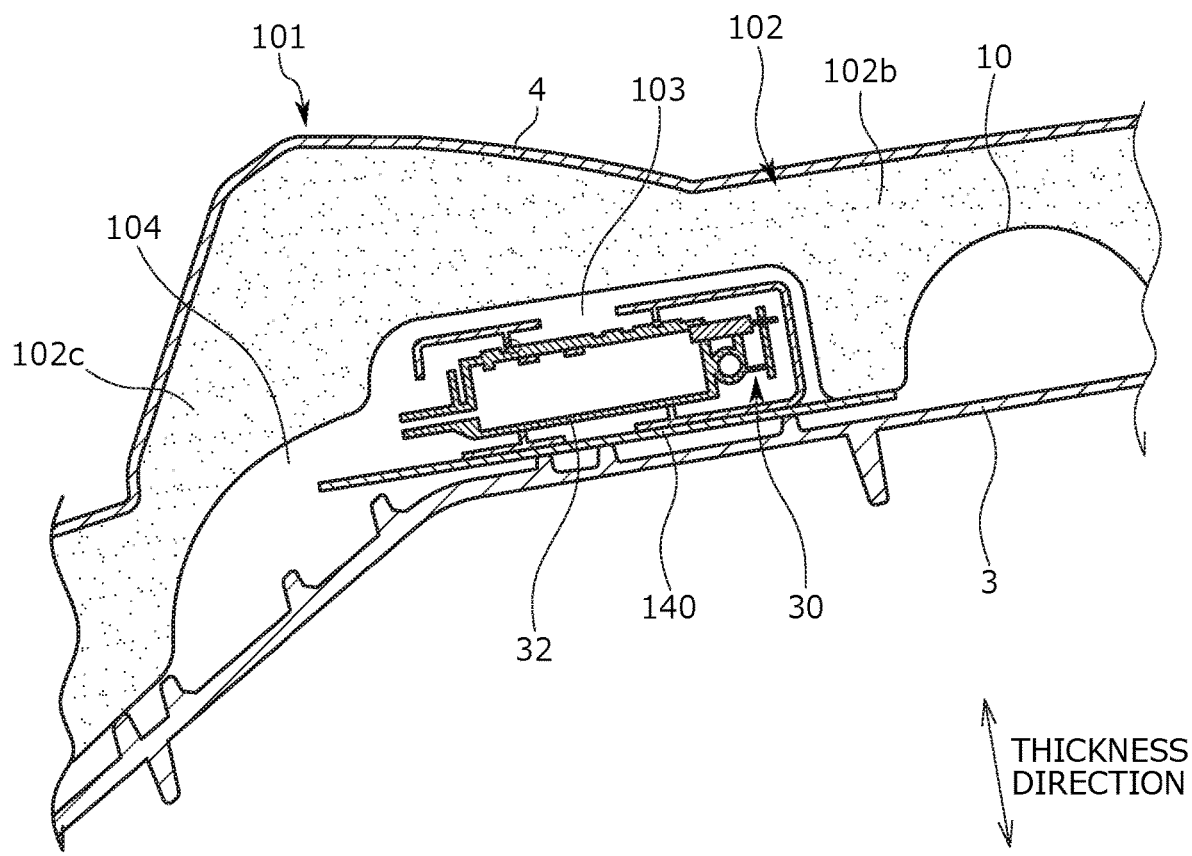
FIG. 20 is a cross-sectional view of a vehicle seat of the variation along an A-A line of FIG. 15, according to an embodiment.

Another embodiment (hereinafter referred to as a "variation") of the seating device of the present disclosure is described below with reference to FIGS. 15 to 20. FIG. 15 is a schematic view of a bottom portion of a cushion member 102 of the variation and each type of equipment disposed on the bottom portion. Note that in FIG. 15, a below-described cover member 140 is omitted for the sake of illustration of equipment arrangement. FIG. 16 is a plan view of a below-described air cell unit 120, and FIG. 17 is an exploded, perspective view of the air cell unit 120. FIGS. 18A, 18B, and 18C are side, schematic views of assembly steps of the air cell unit 120. Note that an assembly state of the air cell unit 120 transitions in the order of FIGS. 18A, 18B, and 18C. FIG. 19A is an enlarged, partial schematic view of a region X of FIG. 16. FIG. 19B is a schematic cross-sectional view along an X-X line of FIG. 19A. FIG. 20 is a cross-sectional view of a vehicle seat 101 of the variation illustrated in FIG. 15, specifically a cross-sectional view along an A-A line of FIG. 15. Note that in FIG. 20, the thickness direction of the vehicle seat 101 is indicated by an arrow.

A seating device (hereinafter referred to as a "second seating device 100X") of the variation is similar to the above-described seating device (the present device 100) in terms of a basic configuration and operation of each section of the device. However, the second seating device 100X is different from the above-described seating device in terms of an air cell configuration and a cushion member configuration of the vehicle seat. Differences between the second seating device 100X and the present device 100 are mainly described below.

As illustrated in FIG. 15, the cushion member 102 of the vehicle seat 101 at the second seating device 100X is divided into a portion forming a hip support portion 102a at a seating portion on a seat front side and a portion provided with a hip support portion 102b at a seating portion on a seat back side. A middle portion of the cushion member 102, specifically a portion sandwiched between the front and back hip support portions 102a, 102b, forms an inclined portion 102c. As illustrated in FIG. 20, the inclined portion 102c is a portion of the cushion member 102 inclining with respect to the thickness direction of the vehicle seat 101 (in other words, the upper-to-lower direction of the vehicle seat 101). Note that in the present variation, the inclined portion 102c inclines to be positioned lower toward the front side.

In the present variation, air cells and a fluid supply mechanism 30 are arranged on a bottom portion of the cushion member 102 as illustrated in FIG. 15. Specifically, a plurality of recessed portions 10 for housing the air cells are formed at the bottom portion of each of the front and back hip support portions 102a, 102b of the cushion member 102. At the bottom portion of the front hip support portion 102a, the above-described recessed portions 10 are used such that air cells 121, 122 of the air cell unit 120 are arranged respectively in the recessed portions 10.

Of the bottom portion of the back hip support portion 102b, a portion adjacent to the inclined portion 102c is recessed to form a space. As illustrated in FIG. 15, an air supply pump 31 and a valve unit 32 of the fluid supply mechanism 30 are arranged in the space. That is, a housing space 103 formed by a recessed portion of the bottom portion of the cushion member 102 is provided at the bottom portion of the cushion member 102, and the air supply pump 31 and the valve unit 32 are housed in the housing space 103. The air supply pump 31 and the valve unit 32 as described herein are equivalent to electric equipment, and power is supplied from a not-shown power source such that the air supply pump 31 and the valve unit 32 operate to supply compressed air to each air cell.

Of the bottom portion of the inclined portion 102c, a portion adjacent to the back hip support portion 102b is recessed to form a cavity 104. The cavity 104 is formed as a space continuous to the above-described housing space 103. That is, the housing space 103 and the cavity 104 are continuous to each other as a single space, and form a substantially rectangular space when viewed from a bottom side of the cushion member 102.

As illustrated in FIG. 20, one end of the above-described recessed space is an opening, and such an opening is disposed to face a side close to a bottom plate 3. Further, at least a portion of the opening is covered with the cover member 140 as illustrated in FIG. 20. The cover member 140 is configured to control entering of foreign substances, rainwater, etc. into the housing space 103, and is made of a waterproof leather material, for example.

In the variation, the cover member 140 covers at least the portion of the opening of the housing space 103, and in particular, covers substantially the entirety of the opening of the housing space 103. On the other hand, a portion of an opening of the cavity 104 continuous to the housing space, specifically a portion apart from the housing space 103, is an opening not covered with the cover member 140. As just described, in the variation, the cover member 140 covers the opening of the housing space 103 in the state in which at least the portion of the opening of the cavity 104 is opened. With this configuration, ventilation to the housing space 103 can be ensured while adherence of foreign substances, rainwater, etc. to the air supply pump 31 and the valve unit 32 can be reduced.

Even if rainwater enters the housing space 103, such rainwater can be properly discharged through the uncovered portion of the opening of the cavity 104. That is, the cavity 104 is formed at a portion of the bottom portion of the cushion member 102 positioned at the inclined portion 102c.

Thus, as long as the portion of the opening of the cavity 104 is opened, rainwater etc. entering the housing space 103 flows (downward) toward the uncovered portion of the opening, and eventually, is discharged through such a portion. Further, since the portion of the opening of the cavity 104 is opened, influence of heat emitted from an engine (not shown) positioned below the vehicle seat 101 can be reduced.

Next, the air cell unit utilized in the variation is described. The air cell unit 120 is configured such that the air cells 121, 122 arranged at the portion positioned at the front hip support portion 102a are integrated together. The configuration of the air cell unit 120 is described with reference to FIG. 16. As illustrated in FIG. 16, the air cell unit 120 includes an air cell group having five air cells 121 arranged in an X-shape, and a pair of right and left air cells 122 arranged respectively on both sides of the air cell group. As in the air cell 20 (e.g., the air cell 20 illustrated in FIG. 2) of the above-described embodiment, each of the air cells 121, 122 has a two-tiered structure with upper and lower expandable portions.

The air cell group including five air cells 121 is disposed at a center portion of the front hip support portion 102a in the width direction. As in the above-described air cell group 26 illustrated in FIG. 10, the air cell group is configured such that the center air cell 121 is coupled with other air cells 121 (specifically, the air cells 121 surrounding the center air cell 121). Note that the air cells 121 are coupled together via below-described flow path formation members 124. That is, an internal space of the center air cell 121 and internal spaces of other air cells 121 communicate with each other through a flow path formed by the flow path formation members 124. Thus, when compressed air is supplied to the center air cell 121, each air cell 121 of the air cell group expands.

Each of the pair of right and left air cells 122 has a substantially fan-shaped outer shape, and these air cells 122 are arranged respectively at end portions of the front hip support portion 102a in the width direction. Moreover, the right and left air cells 122 in a pair are coupled together through a flow path formation member 124 described below. That is, an internal space of the air cell 122 on one end side (the left side) in the width direction and an internal space of the air cell 122 on the other end side (the right side) in the width direction communicate with each other through the flow path formed by the flow path formation member 124. Thus, when compressed air is supplied to the pair of right and left air cells 122, both air cells 122 simultaneously expand.

The air cell unit 120 has the compressed air flow paths. That is, in the variation, the air cell unit 120 includes the flow path formation members 124. The flow paths formed by the flow path formation members 124 extend toward the air cells 121, 122 of the air cell unit 120. As illustrated in FIG. 16, a tip end portion of a tube 33 is inserted into a tip end portion (an upstream end portion) of the flow path formation member 124, and a terminal end portion (a downstream end portion) of the flow path formation member 124 is connected to a suction/discharge port of each of the air cells 121, 122.

Note that in the case illustrated in FIG. 16, the flow path formation members 124 for supplying compressed air to the air cell group including five air cells 121 and the flow path formation member 124 for the pair of right and left air cells 122 are separately provided. That is, two lines of the flow path formation members 124 are provided, and insertion ports 125 into each of which the tip end portion of the tube 33 is inserted are provided separately for the lines. Note that the present disclosure is not limited to such a configuration, and the above-described two lines of the flow path formation members 124 may be integrated together (i.e., a common line may be shared).

The flow path formation member 124 described herein is made of a bendable material, specifically a polyurethane sheet or a resin film sheet made of, e.g., polyvinyl chloride. Further, in the configuration illustrated in FIG. 16, the air cells 121, 122 and the flow path formation members 124 are integrally made of a common material. Specifically, the air cell unit 120 is configured such that four types of resin film sheets (specifically, a first sheet 201, a second sheet 202, a third sheet 203, and a fourth sheet 204) having different sizes as illustrated in FIG. 17 are stacked on each other. The above-described four types of resin films are stacked on each other to mold the air cell unit 120, and as a result, the air cells 121, 122 and the flow path formation members 124 are integrally molded.

Specifically, each of the air cells 121, 122 of the air cell unit 120 is formed using all of the above-described four types of resin films. Of each of the air cells 121, 122 each including the two-tiered upper and lower expandable portions, the upper expandable portion is formed of the first sheet 201 forming the uppermost layer and the second sheet 202 forming the second layer from the top, and the lower expandable portion is formed of the third sheet 203 forming the third layer from the top and the fourth sheet 204 forming the lowermost layer.

The assembly steps of the air cell unit 120 (in particular, formation steps of the air cells 121, 122) is described with reference to FIGS. 18A to 18C. In assembly of the air cell unit 120, the third sheet 203 formed with a relatively-large flat surface is first set on a mold. At this point, the third sheet 203 is cut along the outer shape of the air cell unit 120, and specifically, is cut in a substantially isosceles trapezoidal shape as illustrated in FIG. 17.

Subsequently, the second sheet 202 is disposed on the third sheet 203 set on the mold. More specifically, the second sheet 202 is cut along the outer shape of each of the air cells 121, 122, and is disposed at a predetermined portion of an upper surface of the third sheet 203 set on the mold. At this point, the pieces of the second sheet 202 in the above-described shapes are, as illustrated in FIG. 18A, arranged corresponding respectively to the formation positions of the air cells 121, 122 by position control using guides 212. In other words, portions of the third sheet 203 corresponding respectively to the formation positions of the air cells 121, 122 are provided with air holes. Moreover, each piece of the second sheet 202 cut into a corresponding one of the above-described shapes has an air hole. Then, the second sheet 202 is disposed at such a position that each air hole of the second sheet 202 communicates with a corresponding one of the air holes of the third sheet 203.

Then, the second sheet 202 is welded to the third sheet 203 with a core 211 being interposed between an outer edge portion of the second sheet 202 and the third sheet 203. More specifically, welding tools (welders) 210 for thermal welding are pressed against the periphery of each air hole of the second sheet 202, and in this manner, a portion around such an air hole of the second sheet 202 is thermally welded to a portion around a corresponding one of the air holes of the third sheet 203.

Subsequently, the first sheet 201 is placed on the second sheet 202. At this point, the first sheet 201 is cut to have the same outer shape as that of the second sheet 202. The first sheet 201 is thermally welded to the second sheet 202 with the first sheet 201 being placed on the second sheet 202. More specifically, in the state in which an edge portion of each piece of the first sheet 201 cut into the above-described shape overlaps with an edge portion of a corresponding one of the pieces of the second sheet 202, the welding tools 210 are pressed against these edge portions to thermal weld the edge portions together as illustrated in FIG. 18B.

Subsequently, the fourth sheet 204 is set below the third sheet 203, and the third sheet 203 and the fourth sheet 204 are thermally welded together. More specifically, as in the third sheet 203, the fourth sheet 204 is cut along the outer shape of the air cell unit 120. Then, in the state in which the fourth sheet 204 at the position below the third sheet 203 overlaps with the third sheet 203, predetermined portions of these sheets are thermally welded together. More specifically, the welding tools 210 are pressed against portions positioned at an outer edge of each of the air cells 121, 122 (in particular, an outer edge of the lower expandable portion), and such portions are thermally welded together, as illustrated in FIG. 18C.

Note that when the third sheet 203 and the fourth sheet 204 are thermally welded together, thermal welding is performed such that predetermined portions of these sheets form the flow path formation members 124. More specifically, a portion of the third sheet 203 positioned at the flow path is lifted from the fourth sheet 204, and then, other portions (excluding portions corresponding to the air cells 121, 122) than the lifted portion are thermally welded together. In this manner, the lifted portion of the third sheet 203 and the fourth sheet 204 positioned below such a portion form the flow path formation member 124.

As described above, in the variation, the flow path formation members 124 are simultaneously molded in the process of assembling the air cell unit 120 (in other words, the process of forming the air cells 121, 122). Note that portions of the air cell unit 120 other than the air cells 121, 122 and the flow path formation members 124 (specifically, the portion at which the third sheet 203 and the fourth sheet 204 are joined together) form a sheet-shaped base portion 123.

As described above, the flow path formation members 124 provided in the air cell unit 120 are formed of the resin film sheets, and therefore, are configured to be bendable. In the variation, the air cells 121, 122 and the flow path formation members 124 are integrally made of the common material. Thus, when the air cells 121, 122 expand, there is a likelihood that such movement is transmitted to the flow path formation members 124 to bend the flow path formation members 124 (cause bending wrinkles), for example. Such bending of the flow path formation members 124 might result in clogging of the flow paths. Due to clogging of the flow paths, supply of compressed air to the air cells 121, 122 and discharging of compressed air from the air cells 121, 122 are not properly performed.

For these reasons, in the variation, a tubular body 130 is disposed in each flow path formation member 124 for the purpose of controlling bending of the flow path formation member 124. Specifically, as illustrated in FIG. 16, the tubular body 130 is disposed in each flow path formation member 124 coupling the center air cell 121 and other air cells 121 together in the air cell group including five air cells 121. Moreover, as illustrated in FIG. 16, the tubular body 130 is disposed in the flow path formation member 124 extending toward the pair of right and left air cells 122.

The tubular body 130 is now described. The tubular body 130 is a cylindrical pipe piece having a smaller outer diameter than that of the flow path formed by the flow path formation member 124 and made of a material (e.g., a resin molded article thicker than the flow path formation member 124) harder than the material of the flow path formation member 124. The inside of the tubular body 130 forms a portion of the flow path for compressed air. That is, when reaching the arrangement position of the tubular body 130, compressed air flowing through the flow path flows through the inside of the tubular body 130.

Since the tubular body 130 is disposed in the flow path formation member 124 as described above, bending of the flow path formation member 124 is controlled, and as a result, clogging of the flow path due to bending of the flow path formation member 124 can be reduced.

Note that in the variation, at least a portion of the tubular body 130 is disposed at a connection portion between the flow path formed by the flow path formation member 124 and the air cell 121, 122 in the flow path formation member 124, as illustrated in FIG. 19A. For example, the tubular body 130 passes through the suction/discharge port of the air cell 121, 122, and the portion of the tubular body 130 enters the air cell 121, 122. With this arrangement position, the effect of the tubular body 130 is remarkably produced. That is, the connection portion between the flow path for compressed air and the air cell 121, 122 is a promotes proper expansion/contraction of the air cell 121, 122, and clogging of the flow path at such a portion is preferentially avoided. For this reason, the tubular body 130 is disposed at the above-described arrangement position, and as a result, can be utilized to effectively reduce clogging of the flow path.

Of the flow path formation member 124, a portion (hereinafter referred to as a "tubular body included portion") in which the tubular body 130 is disposed has a cross-sectional structure (a cross-sectional structure intersecting the extension direction of the flow path formation member 124) illustrated in FIG. 19B. Specifically, the tubular body included portion includes a raised portion 124a and a flat portion 124b, as illustrated in FIG. 19B. The raised portion 124a is a portion of the cylindrical tubular body included portion raised in an arc shape along a surface of the cylindrical tubular body 130. The raised portion 124a is positioned to face the cushion member 102.

The flat portion 124b is a portion extending flat and positioned opposite to the raised portion in the tubular body included portion. That is, a portion of the tubular body included portion positioned opposite to the cushion material 102, i.e., a portion facing the bottom plate 3, is not in a shape curved in an arc shape as in the raised portion 124a, but is in a flat shape. Thus, the tubular body included portion receives, at the surface (the flat surface), a load applied from the side close to the bottom plate 3. Since the load is received at the flat surface, occurrence of the situation in which the flow path formation member 124 is damaged (broken) due to the load from the side close to the bottom plate 3 can be reduced.

As described above, in the variation, the tubular body 130 is disposed in each flow path formation member 124. In the variation, the tubular body 130 is inserted into each flow path formation member 124 in assembly of the air cell unit 120. Specifically, at the assembly steps of the air cell unit 120, the tubular bodies 130 are fixed in advance to the resin film sheet forming the flow path formation members 124, specifically the third sheet 203. More specifically, as illustrated in FIG. 17, each tubular body 130 is fixed to a corresponding position (for example, a position at which the flow path formation member 124 is provided and which is close to the suction/discharge port of the air cell 121, 122) of a lower surface of the third sheet 203.

Note that a material forming the tubular body 130 is the same type of material (i.e., the material forming the flow path formation member 124) as that of the third sheet 203, in an embodiment. Thus, in the variation, the tubular bodies 130 are fixed to the lower surface of the third sheet 203 by thermal welding. In other words, in the state in which the air cell unit 120 is completed, the tubular bodies 130 are fixed respectively to the flow path formation members 124 by thermal welding. With such a configuration, the tubular bodies 130 can be easily fixed respectively to the flow path formation members 124.

After the tubular bodies 130 have been fixed (thermally welded) to the lower surface of the third sheet 203, the air cell unit 120 is assembled by the above-described steps. Thus, the air cell unit 120 configured such that the tubular bodies 130 are arranged respectively in the flow path formation members 124 can be easily formed.

Note that a size of the flow path formation member 124 (for example, a diameter of the flow path) may be determined and/or selected, and may be varied according to location. In response to this, an external diameter and an internal diameter may be properly varied according to the installation location. Specifically, it is preferable to set a proper size according to flow rate (i.e., air supply rate) of the compressed air flowing in the tubular bodies 130.

Other Embodiments

In the above-described embodiment, the example of the seat apparatus of the present disclosure has been mainly described. However, the above-described embodiment is for the sake of easy understanding of the present disclosure, and does not limit the present disclosure. That is, changes and modifications can be made to the present disclosure without departing from the gist of the present disclosure, and needless to say, the present disclosure includes equivalents thereof.

In the above-described embodiment, the configuration in which expansion operation of each air cell 20 is automatically performed according to the traveling location of the motorcycle has been described, but the present disclosure is not limited to such a configuration. For example, an operation section including a button, a switch, etc. may be provided such that the ECU 34 expands each air cell 20 with passenger's operation of the operation section as a trigger. Note that by operation of the above-described operation section, the air cells 20 to be actually expanded may be selected from the air cells 20.

In the above-described embodiment, the case where the ECU 34 mainly controls the valve unit 32 according to the traveling location as the traveling condition of the motorcycle has been described as an example. Note that control may be made according to other traveling conditions than the traveling location, and for example, control may be made according to the vehicle speed or a road condition. Alternatively, the valve unit 32 may be controlled according to other items than the traveling condition of the motorcycle, and for example, control may be made according to the shape or type of the body of the passenger or a passenger's request.

In the above-described embodiment, compressed air has been described as an example of fluid, and the air cell 20 configured to expand by injection of the compressed air has been used. Note that a bag body capable of expanding by injection of other types of fluid than the compressed air, such as types of gas other than air, liquid such as water, or fluid in the form of gel, may be used instead of the air cell 20.

In the above-described embodiment, three patterns illustrated in FIGS. 12 to 14 have been described as the example patterns (in other words, the modes in control of the valve unit 32) of the air cells 20 which are included in the air cells 20 and which are to be actually expanded. Note that the expansion patterns of the air cells 20 are not limited to those illustrated in FIGS. 12 to 14, but can be freely set.

TABLE OF REFERENCE NUMERALS 1 vehicle seat
1a, 1b seating portion
1c non-seating portion
2 cushion member
2a, 2b hip support portion (portion positioned at the seating portion)
2c non-supporting portion (portion different from the seating portion)
2X bottom portion
3 bottom plate
4 skin material
10 recessed portion
20 air cell (bag body)
21 upper expandable portion (expandable portion)
22 lower expandable portion (expandable portion)
23 narrowed portion (dividing portion)
24 injection port
25 communication portion
26 air cell group
30 fluid supply mechanism
31 air supply pump (compressed air generation device)
32 valve unit (switching device)
33 tube (supply path formation member)
34 ECU (control device) 34a memory
35 sensor
36 mountain pass road switch
100 present apparatus (seat apparatus)
100X second seat apparatus
101 vehicle seat
102 cushion member
102a, 102b hip support portion
102c inclined portion
103 housing space
104 cavity
120 air cell unit
121, 122 air cell (bag body)
123 sheet-shaped base portion
124 flow path formation member
124a raised portion
124b flat portion
125 insertion port
130 tubular body
140 cover member
201 first sheet
202 second sheet
203 third sheet
204 fourth sheet
210 welding tool
211 core
212 guide

What is claimed is:

1. A seat apparatus comprising:
a vehicle seat including a cushion member;
a plurality of bag bodies configured to expand by injection of fluid; and
a fluid supply mechanism configured to supply the fluid to the plurality of the bag bodies,
wherein each of the plurality of the bag bodies is provided at a bottom portion of the cushion member and includes:
two or more expandable portions that are arranged adjacent to each other; and
a dividing portion that is interposed between the two or more expandable portions,
wherein the two or more expandable portions have different respective sizes, and
wherein a smallest expandable portion that has a smallest size among the two or more expandable portions is disposed at a position closer to a passenger side surface of the cushion member than a bottom surface of the cushion member.

2. The seat apparatus according to claim 1,
wherein the cushion member comprises a recessed portion in which the smallest expandable portion is housed.

3. The seat apparatus according to claim 1,
wherein the two or more expandable portions are arranged on a same vertical plane.

4. The seat apparatus according to claim 1,
wherein the plurality of the bag bodies are arranged side by side in a seat width direction.

5. The seat apparatus according to claim 1,
wherein the fluid supply mechanism includes a tube configured to be a supply path of the fluid to the plurality of the bag bodies, and
wherein the tube is arranged at a central portion of the cushion member in a seat width direction.

6. The seat apparatus according to claim 1,
wherein the fluid supply mechanism includes a tube configured to be a supply path of the fluid to the plurality of the bag bodies,
wherein the plurality of the bag bodies are integrally united as a unit; and
wherein the tube is disposed at a central portion of the unit in a seat width direction.

7. The seat apparatus according to claim 1,
wherein the fluid supply mechanism includes a tube configured to be a supply path of the fluid to the plurality of the bag bodies,
wherein the plurality of the bag bodies are integrally united as a unit; and
wherein the tube is connected to a bag body among the plurality of the bag bodies that is disposed at a central portion of the unit.

* * * * *